United States Patent
Maruyama

(10) Patent No.: US 8,698,420 B2
(45) Date of Patent: Apr. 15, 2014

(54) LED DRIVE CIRCUIT, LED LAMP, LED LIGHTING APPLIANCE, AND LED LIGHTING SYSTEM

(75) Inventor: Yasuhiro Maruyama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 915 days.

(21) Appl. No.: 12/715,467

(22) Filed: Mar. 2, 2010

(65) Prior Publication Data
US 2010/0225251 A1   Sep. 9, 2010

(30) Foreign Application Priority Data
Mar. 6, 2009 (JP) ................. 2009-053307

(51) Int. Cl.
*G05F 1/00* (2006.01)
*H05B 37/02* (2006.01)
*H05B 39/04* (2006.01)
*H05B 41/36* (2006.01)

(52) U.S. Cl.
USPC .......................................... 315/307; 315/297

(58) Field of Classification Search
USPC .............. 315/224, 291, 209 R, 307, 297, 312
See application file for complete search history.

(56) References Cited

U.S. PATENT DOCUMENTS

| | | | |
|---|---|---|---|
| 6,057,651 A | 5/2000 | Usami | |
| 6,448,713 B1 * | 9/2002 | Farkas et al. ................ | 315/291 |
| 7,649,327 B2 * | 1/2010 | Peng ............ | 315/312 |
| 2007/0182338 A1 * | 8/2007 | Shteynberg et al. ...... | 315/200 R |
| 2008/0150450 A1 * | 6/2008 | Starr et al. ............... | 315/294 |
| 2008/0258647 A1 | 10/2008 | Scianna | |
| 2009/0102399 A1 | 4/2009 | Kita | |
| 2010/0013405 A1 * | 1/2010 | Thompson et al. ........... | 315/291 |
| 2010/0219764 A1 | 9/2010 | Yamasaki et al. | |
| 2012/0139431 A1 | 6/2012 | Thompson et al. | |

FOREIGN PATENT DOCUMENTS

| | | |
|---|---|---|
| CN | 101513122 A | 8/2009 |
| JP | 2000-173304 | 6/2000 |
| JP | 2001-215913 A | 8/2001 |
| JP | 2003-151782 | 5/2003 |
| JP | 2004-296205 | 10/2004 |
| JP | 2005-11739 A | 1/2005 |
| JP | 2005-26142 A | 1/2005 |
| JP | 2006-319172 A | 11/2006 |
| JP | 2007-227155 A | 9/2007 |
| JP | 2007-538378 | 12/2007 |
| JP | 2007-538378 A | 12/2007 |
| JP | 2009-43694 | 2/2009 |
| JP | 2009-104848 A | 5/2009 |
| JP | 2009-123681 A | 6/2009 |
| JP | 2009-238525 A | 10/2009 |
| JP | 2011-003467 A | 1/2011 |
| KR | 10-2006-0098345 A | 9/2006 |
| KR | 2008-0047521 A | 5/2008 |

* cited by examiner

*Primary Examiner* — Douglas W Owens
*Assistant Examiner* — Dedei K Hammond
(74) *Attorney, Agent, or Firm* — Birch, Stewart, Kolasch & Birch, LLP

(57) ABSTRACT

An LED drive circuit receives an alternating-current voltage and drives an LED. The LED drive circuit has a current extractor which extracts a current from the current supply line through which an LED drive current is supplied to the LED, and a timing adjuster which adjusts the current extraction start timing and the current extraction duration in the current extractor.

15 Claims, 32 Drawing Sheets

600

700

800

LED DRIVE CIRCUIT, LED LAMP, LED LIGHTING APPLIANCE, AND LED LIGHTING SYSTEM

This nonprovisional application claims priority under 35 U.S.C. §119(a) on Patent Application No. 2009-53307 filed in Japan on Mar. 6, 2009, the entire contents of which are hereby incorporated by reference.

BACKGROUND OF THE INVENTION

1. Field of the Invention

The present invention relates to LED drive circuits for driving an LED (light-emitting diode), and to such LED lamps, LED lighting appliances, and LED lighting systems as use an LED as light sources.

2. Description of Related Art

For their advantages such as low current consumption and long lifetimes, LEDs have been widening their application beyond display apparatuses into lighting equipment and the like. In many pieces of LED lighting equipment, a plurality of LEDs are used to obtain the desired luminance.

Many common pieces of lighting equipment use a commercial AC (alternating-current) 100 V power source, and when consideration is given to cases such as where LED lamps are used in place of common lamps such as incandescent lamps, it is desirable that LED lamps are configured to use, like common lamps, a commercial AC 100 V power source.

For the control of the light of incandescent lamps, phase-control light controllers (generally called incandescent light controllers) are used, which allow easy control of light by means of a variable-resistance device though the control of the power supplied to the incandescent lamp achieved by turning a switching device (commonly, a thyristor device or a triac device) on at a given phase angle of an AC power source voltage. An example of the configuration of an incandescent lamp lighting system provided with an incandescent lamp and a phase-control light controller is shown in FIG. 14.

The incandescent lamp lighting system shown in FIG. 14 is provided with a phase-control light controller 2 and an incandescent lamp 9. The phase-control light controller 2 is connected in series between an AC power source 1 and the incandescent lamp 9. In the phase-control light controller 2, when the knob (unillustrated) of a potentiometer Rvar1 is set at a given position, a triac Tri1 is turned on at the power phase angle corresponding to that position. In the phase-control light controller 2, a noise prevention circuit is also provided which is constituted by a capacitor C1 and an inductor L1, and the noise prevention circuit reduces the terminal noise that returns from the phase-control light controller 2 to the power line.

An example of the voltage and current waveforms at relevant points in the incandescent lamp lighting system shown in FIG. 14 is shown in FIG. 15A, and an enlarged diagram of the period P in FIG. 15A is shown in FIG. 15B. In FIGS. 15A and 15B, $V_{OUT2}$, $I_2$, and $I_9$ respectively indicate the waveform of the output voltage of the phase-control light controller 2, the waveform of the current passing through the triac Tri1 in the phase-control light controller 2, and the waveform of the current passing through the incandescent lamp 9. In the example shown in FIGS. 15A and 15B, immediately after the triac Tri1 is triggered and turned on, the current passing through the triac Tri1 undulates (swings up and down) several times; when it swings down for the first time, the current passing through the triac Tri1 becomes negative and lower than the holding current, and this means that the triac Tri1 is momentarily turned off immediately after being turned on. Nevertheless, flickering is small, and light control can be done as normally.

It is however known that, with incandescent lamps of lower wattages, flickering and blinking prevent normal light control.

For the control of the light of LED lamps that use an AC power source, it is desirable, as for the control of the light of incandescent lamps, to use phase-control light controller. Now, a conventional example of an LED lighting system that can control the light of LED lamps that use an AC power source is shown in FIG. 16. In FIG. 16, such parts as find their counterparts in FIG. 14 are identified by common reference signs, and no detailed description of such parts will be repeated.

The LED lighting system shown in FIG. 16 is provided with a phase-control light controller 2, an LED drive circuit including a diode bridge DB1 and a current limit circuit 5, and an LED module 3. The phase-control light controller 2 is connected in series between an AC power source 1 and the LED drive circuit.

An example of the voltage and current waveforms at relevant points in the LED lighting system shown in FIG. 16 is shown in FIG. 17A, and an enlarged diagram of the period P in FIG. 17A is shown in FIG. 17B. In FIGS. 17A and 17B, $V_{OUT2}$, $I_2$, and $I_3$ respectively indicate the waveform of the output voltage to the phase-control light controller 2, the waveform of the current passing through a triac Tri1 in the phase-control light controller 2, and the waveform of the current passing through the LED module 3. In the example shown in FIGS. 17A and 17B, immediately after the triac Tri1 is triggered and turned on, the current passing through the triac Tri1 undulates (swings up and down) several times; thus, when the triac Tri1 is turned on at a given phase angle, a wavefoini as if oscillating results, and light control cannot be done normally. As shown in FIG. 17B, which is an enlarged view of the period P in FIG. 17A, after the current passing through the triac Tri1 undulates in the positive and negative directions several times, the triac Tri1 is turned off, and thereafter it is triggered again; thus, the current passing through the triac Tri1 undulates in the positive and negative directions several times, and then the triac Tri1 is turned off—so repeats the same sequence of events. How this occurs is as follows: when the current passing through the triac Tri1 turns from positive to negative, it becomes equal to or lower than the holding current; after the triac Tri1 is turned off, it does not respond for a certain period, and even after this period has elapsed, the current passing through the triac Tri1 remains lower than the holding current until it is triggered next time.

Due to differences in lighting characteristics between incandescent lamps and LEDs, failure of normal light control as described above is more likely to occur in LED lighting systems than in incandescent lamp lighting systems.

JP-A-2006-319172 discloses an LED lighting system as shown in FIG. 18. The LED lighting system shown in FIG. 18 is provided with a phase-control light controller 2, a diode bridge DB1, a current holding means, a rectifying-and-smoothing means, and a LED module 3. The phase-control light controller 2 is connected in series between an AC power source 1 and the diode bridge DB1, and the current holding means and the rectifying-and-smoothing means are provided between the diode bridge DB1 and the LED module 3.

The current holding means is composed of resistors R181 to R186, Zener diodes ZD1 and ZD2, transistors Q181 and Q182, and a capacitor C181. In the current holding means, when the source voltage outputted from the AC power source 1 is equal to or lower than 100 V, the transistor Q182 is on, and passes a current corresponding to the holding current of a triac Tri1 in the phase-control light controller 2; when the source voltage is not equal to or lower than 100 V, the transistor Q182 is off. The transistor Q182 passes a current (about 30 mA) such that the current through the triac Tri1 in the phase-control light controller 2 is not equal to or lower than the holding current.

In the current holding means described above, however, the period during which the corrector current of the transistor Q182 passes is the period after the transistor Q182 turns on until the transistor Q181 turns on, and the transistor Q181 turns on when, after the triac Tri1 in the phase-control light controller 2 turns on, the Zener diode ZD1 turns on. Thus, for example, if the triac Tri1 in the phase-control light controller 2 conducts abruptly, or if the source voltage of the AC power source 1 becomes high, the on-state period of the transistor Q182 may be so short and accordingly the period during which the current that does not become equal to or lower than the holding current of the triac Tri1 passes may be so short that the triac Tri1 cannot turn on.

SUMMARY OF THE INVENTION

An object of the present invention is to provide LED drive circuits that prevent the flickering and blinking of an LED that may occur when an LED is used with phase-control light controllers, and to provide LED lamps, LED lighting appliances, and LED lighting systems employing such LED drive circuits.

To achieve the above object, according to the invention, an LED drive circuit that receives an alternating-current voltage and drives an LED is provided with: a current extractor which extracts a current from the current supply line through which an LED drive current is supplied to the LED; and a timing adjuster which adjusts the current extraction start timing and the current extraction duration in the current extractor (the first configuration).

In the first configuration described above, the timing adjuster may be provided with a voltage detection circuit which monitors the input voltage to the LED drive circuit or a voltage obtained by rectifying the input voltage so that the current extraction in the current extractor is controlled according to the result of the monitoring by the voltage detection circuit (the second configuration).

In the second configuration described above, the timing adjuster may be provided with a comparator which compares the result of the monitoring by the voltage detection circuit with a set voltage so that the current extraction in the current extractor is controlled according to the result of the comparison by the comparator. The comparator may have hysteresis.

In the second configuration described above, the timing adjuster may be provided with a first transistor of which the base is connected to the output of the voltage detection circuit, the current extractor may be provided with a second transistor of which the base is connected to the collector of the first transistor, and the timing adjuster may be further provided with a capacitor which is connected between the bases of the first and second transistors.

In the first configuration described above, the timing adjuster may be provided with a voltage variation detection circuit which detects a variation in the input voltage to the LED drive circuit or a voltage obtained by rectifying the input voltage so that the current extraction in the current extractor is controlled according to the result of the monitoring by the voltage variation detection circuit (the third configuration).

In the third configuration described above, the timing adjuster may be provided with a resistor, a capacitor, and a first transistor of which the base is connected to the node between the resistor and the capacitor, and the current extractor may be provided with a second transistor of which the base is connected to the collector of the first transistor.

In the third configuration described above, the timing adjuster may be provided with a serial circuit having a capacitor and a resistor connected in series in this order from the high-potential side to the low-potential side, and the current extractor may be provided with a transistor of which the base is connected to the node between the capacitor and the resistor.

In the third configuration described above, there may be further provided an unnecessary lighting preventer which prevents the LED from being lit by an unnecessary current.

The current extractor may be provided with a constant-current source which is connected to the emitter of the second transistor, or the transistor, provided in the current extractor so that the second transistor or the transistor provided in the current extractor is driven on a constant-current basis.

To achieve the above object, according to the invention, an LED lamp is provided with: an LED drive circuit of any one of the configurations described above; and an LED connected to the output side of the LED drive circuit.

To achieve the above object, according to the invention, an LED lighting appliance is provided with an LED lamp configured as described above.

To achieve the above object, according to the invention, an LED lighting system is provided with: an LED lamp or an LED lighting appliance configured as described above; and a light control unit which is connected to the input side of the LED lamp or the LED lighting appliance, the light control unit including a phase-control light controller.

DETAILED DESCRIPTION OF PREFERRED EMBODIMENTS

Embodiments of the present invention will be described below with reference to the accompanying drawings.

Embodiment 1

Figure 1:
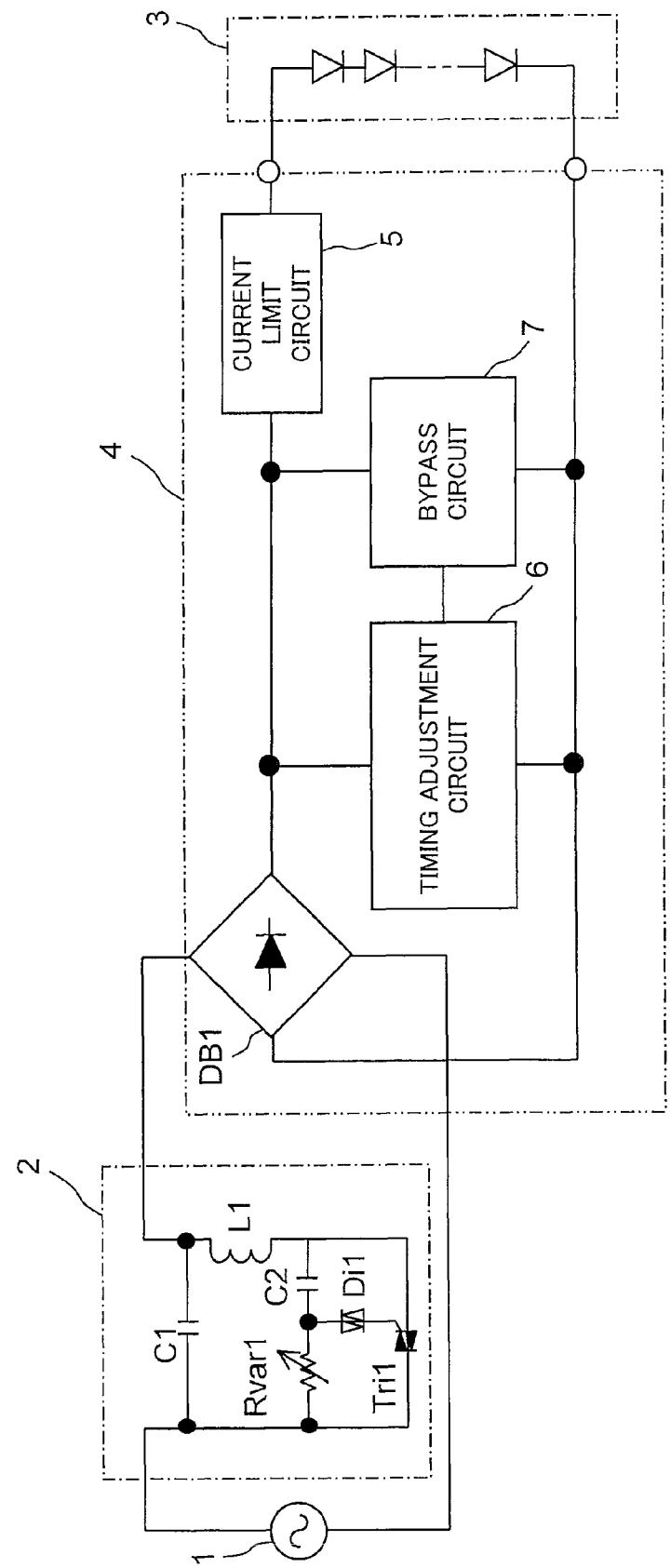
FIG. 1 is a diagram showing an example of the configuration of an LED lighting system according to the invention.
Figure 14:
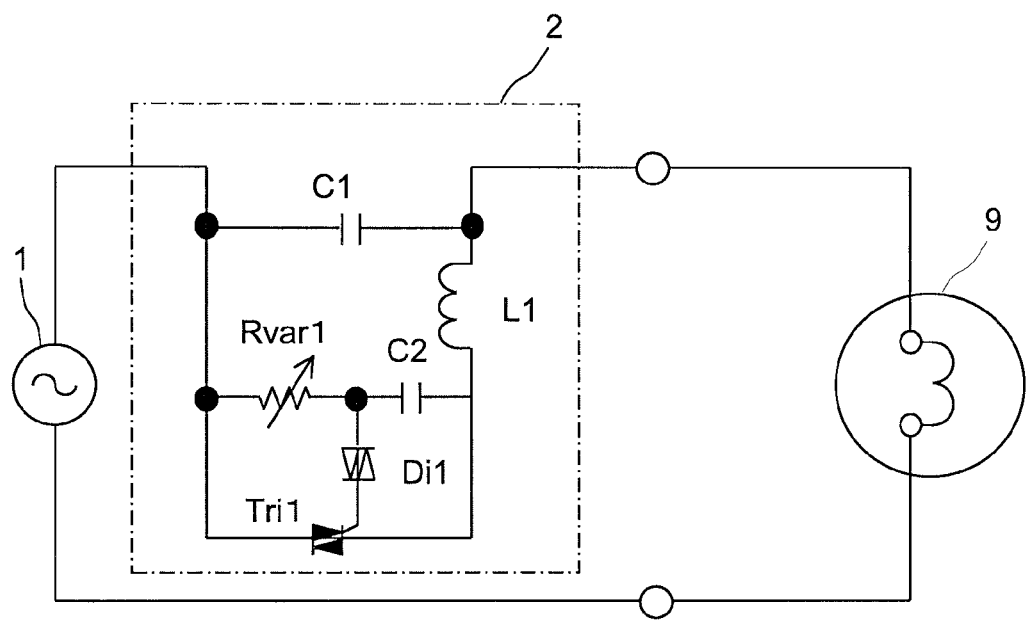
FIG. 14 is a diagram showing an example of the configuration of an incandescent lamp lighting system.
Figure 15A:
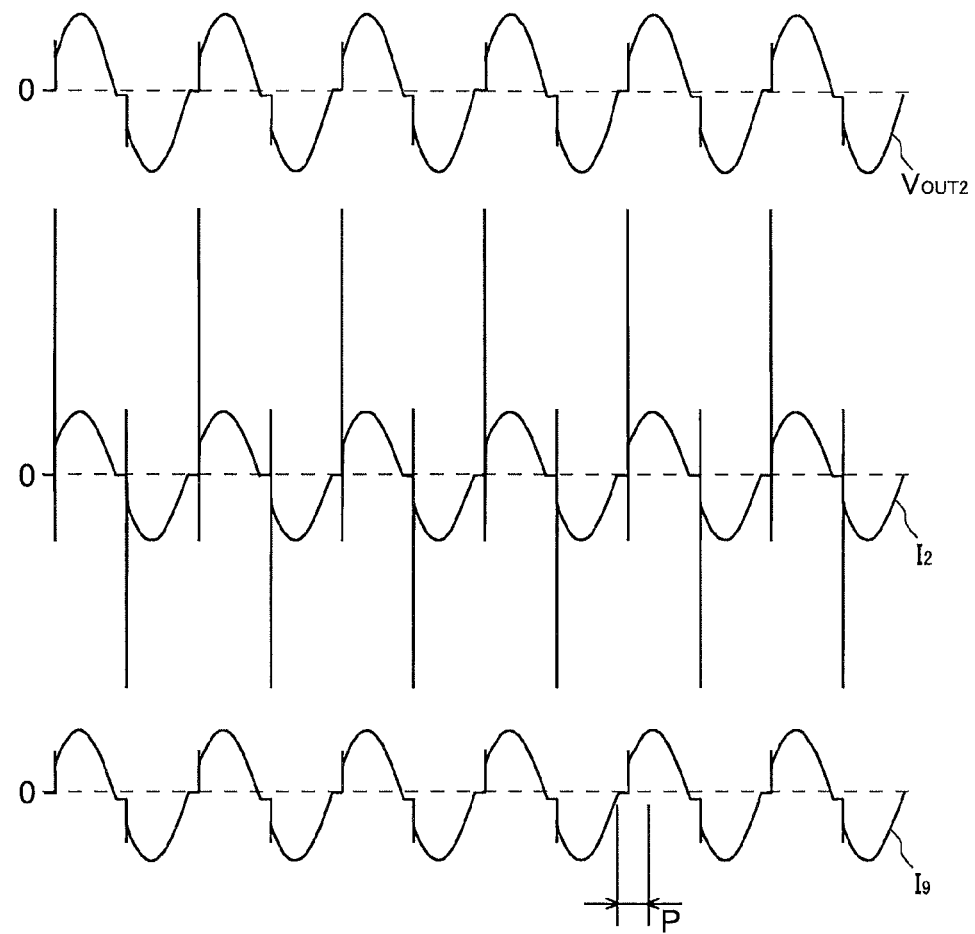
FIG. 15A is a diagram showing an example of the voltage and current waveforms at relevant points in the incandescent lamp lighting system shown in FIG. 14.
Figure 15B:
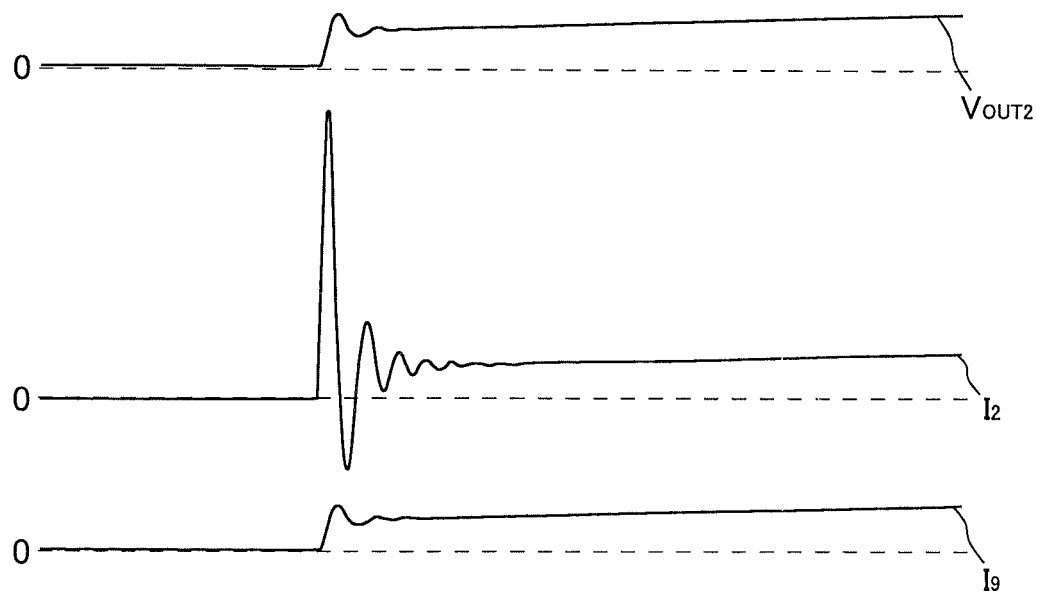
FIG. 15B is an enlarged diagram of part of FIG. 15A.
Figure 16:
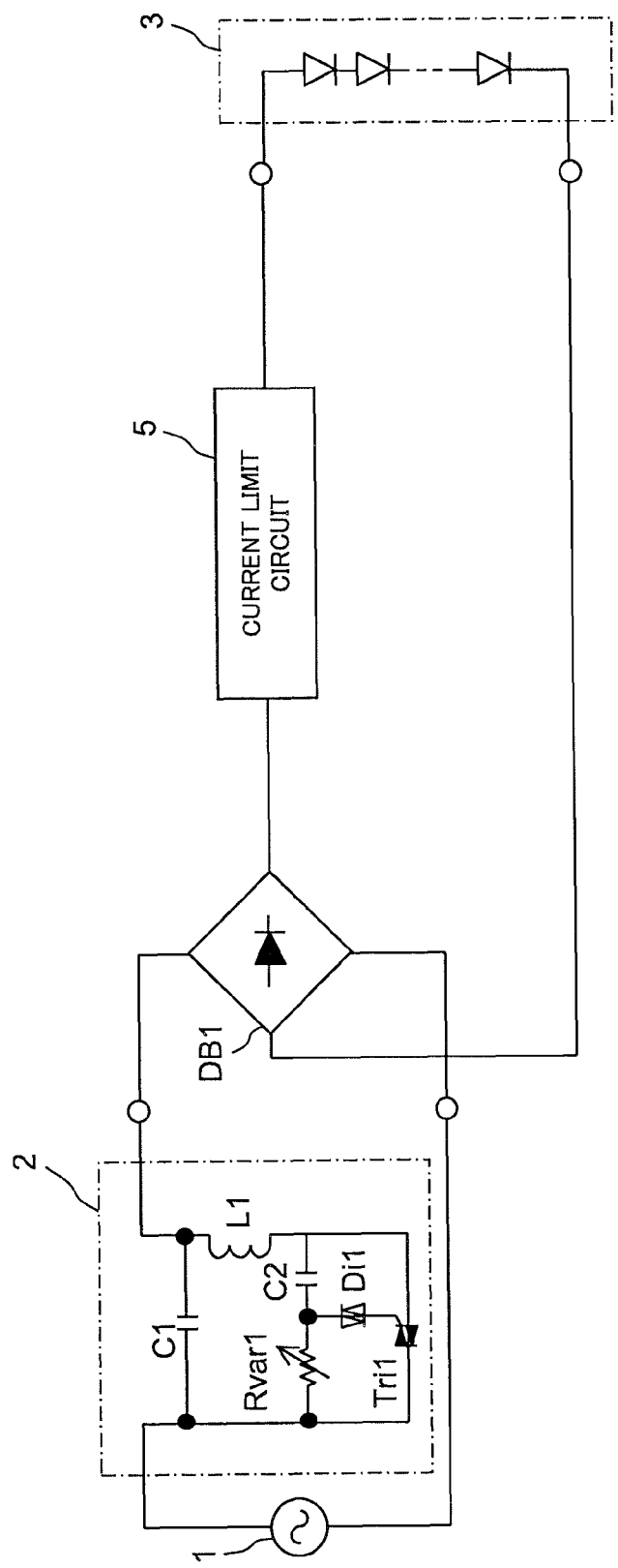
FIG. 16 is a diagram showing a conventional example of an LED lighting system.

An example of the configuration of an LED lighting system according to the invention is shown in FIG. 1. In FIG. 1, such parts as find their counterparts in FIG. 14 are identified by common reference signs, and no detailed description of such parts will be repeated. The LED lighting system according to the invention shown in FIG. 1 is provided with a phase-control light controller 2, an LED module 3, and an LED drive circuit 4. The LED drive circuit 4 is an example of an LED drive circuit according to the invention, and includes a diode bridge DB1, a current limit circuit 5, a timing adjustment circuit 6, and a bypass circuit 7. In the LED lighting system according to the invention shown in FIG. 1, an AC power source 1, the phase-control light controller 2, the diode bridge DB1, the current limit circuit 5, and the LED module 3, which comprises one or more LEDs, are connected in series, and the timing adjustment circuit 6 and the bypass circuit 7 are provided between the diode bridge DB1 and the current limit circuit 5.

The bypass circuit 7 extracts a current from the current supply line through which an LED drive current is supplied to the LED module 3, and passes the extracted current through a bypass line. The timing adjustment circuit 6 adjusts the timing with which the bypass circuit 7 starts to extract current (hereinafter also referred to as the "current extraction start timing") and the period for which the bypass circuit 7 keeps extracting current (hereinafter also referred to as the "current extraction duration").

Figure 17A:
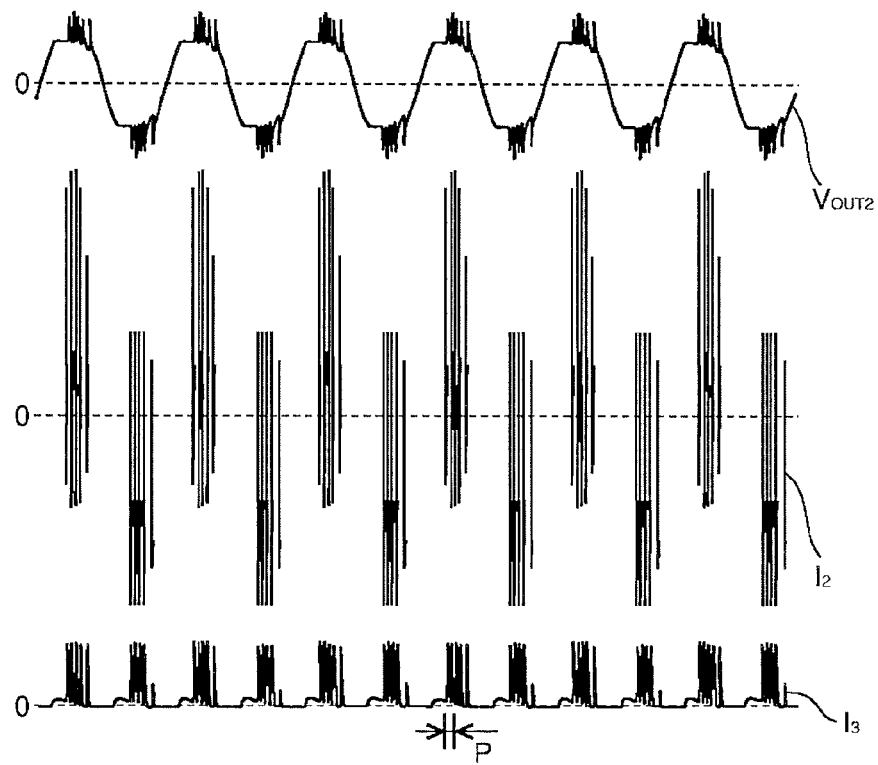
FIG. 17A is a diagram showing an example of the voltage and current waveforms at relevant points in the LED lighting system shown in FIG. 16.
Figure 17B:
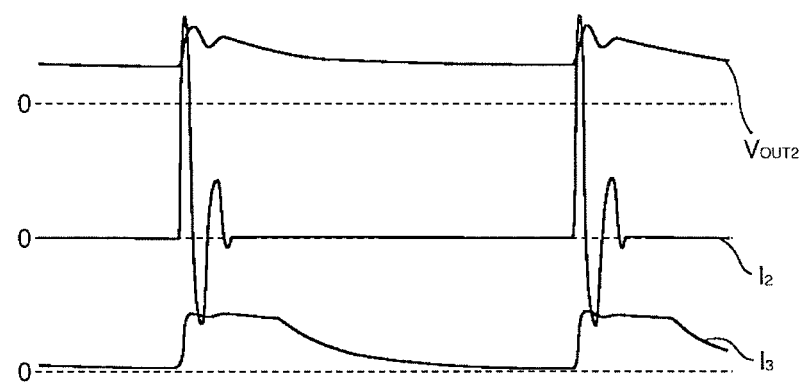
FIG. 17B is an enlarged diagram of part of FIG. 17A.
Figure 18:
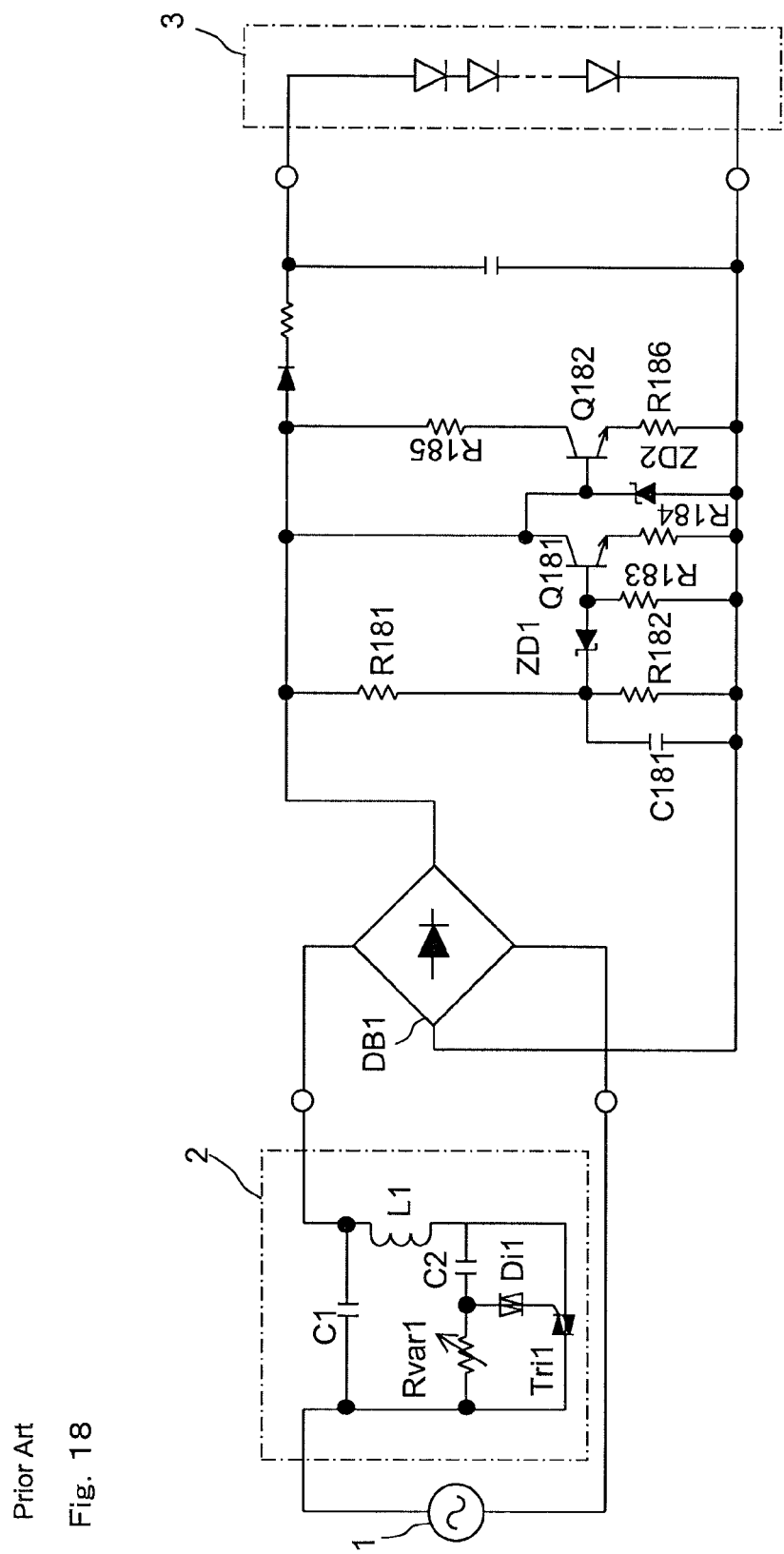
FIG. 18 is a diagram showing another conventional example of an LED lighting system.

Here, the undulation wavelength of the current $I_2$ passing through the triac Tri1 which undulates immediately after the triac Tri1 turns on as shown in FIG. 17B depends on the resonance wavelength $2\pi\sqrt{LC}$ of a capacitor C1 and an inductor L1 constituting a noise prevention filter in the phase-control light controller 2 (L represents the inductance value of the inductor L1, and C represents the capacitance value of the capacitor C1). Accordingly, the timing adjustment circuit 6 needs to adjust the current extraction duration in such a way that the current $I_2$ passing through the triac Tri1 does not become lower than the holding current of the triac Tri1 for a period corresponding to several cycles of that resonance wavelength.

Moreover, since the current $I_2$ passing through the triac Tri1 undulates immediately after the triac Tri1 turns on as shown in FIG. 17B, the bypass circuit 7 needs to start to extract current immediately after the triac Tri1 turns on.

Moreover, the current value of the current extracted by the bypass circuit 7 needs to be set with consideration given to the fact that the bypass circuit 7 extracts not only a current that passes through the triac Tri1 but also a current that does not directly pass through the triac Tri1.

With the above-mentioned factors taken into consideration, the current extraction duration, the current extraction start timing, and the current value of the current extracted by the bypass circuit 7 are adjusted or set; in this way, it is possible to keep the triac Tri1 in the phase-control light controller 2 from turning off for a period corresponding to several cycles of the undulation wavelength at which the current $I_2$ passing through the triac Tri1 undulates.

Embodiment 2

Figure 2:
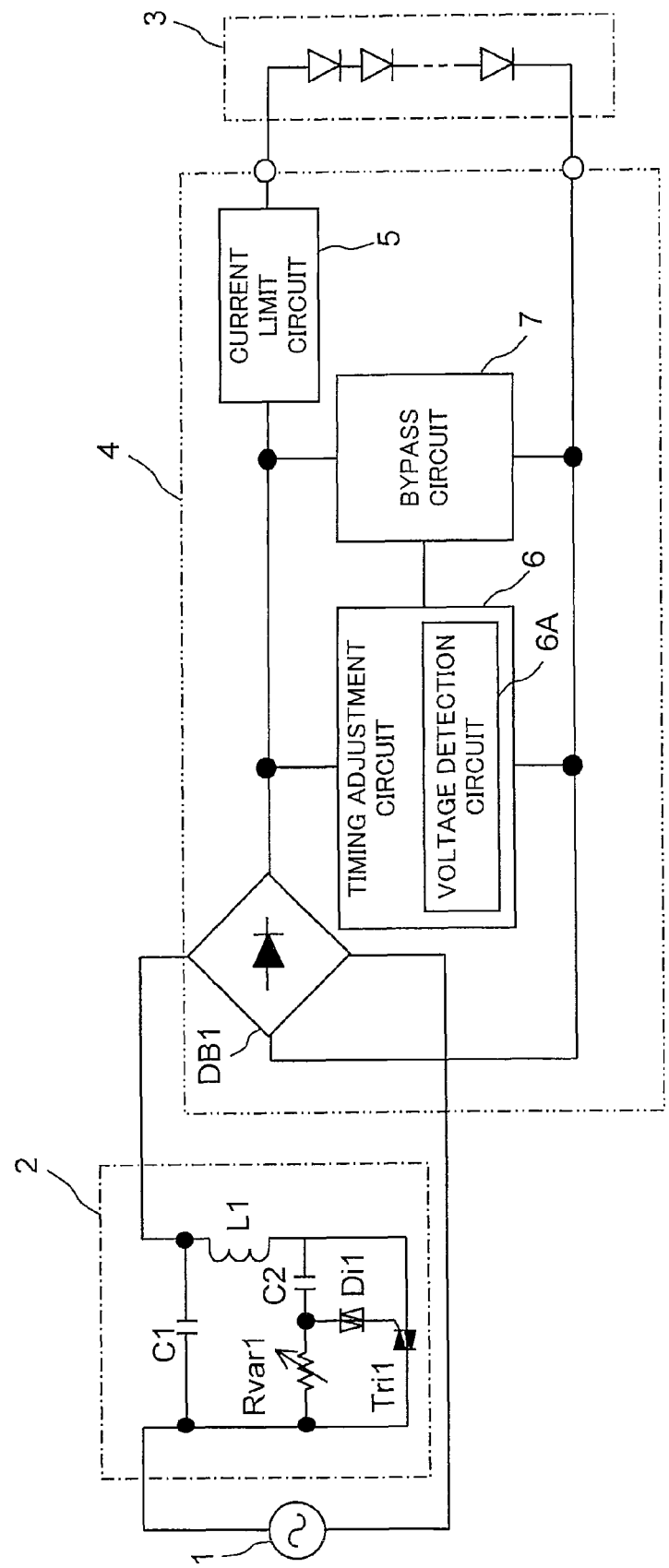
FIG. 2 is a diagram showing an embodiment of the LED lighting system shown in FIG. 1.

Next, an embodiment of the LED lighting system shown in FIG. 1 is shown in FIG. 2. In the configuration shown in FIG. 2, the timing adjustment circuit 6 includes a voltage detection circuit 6A which monitors the output voltage of the diode bridge DB1, and based on the output voltage of the diode bridge DB1 as detected by the voltage detection circuit 6A, the current extraction start timing and the current extraction duration are adjusted.

Embodiment 3

Figure 3:
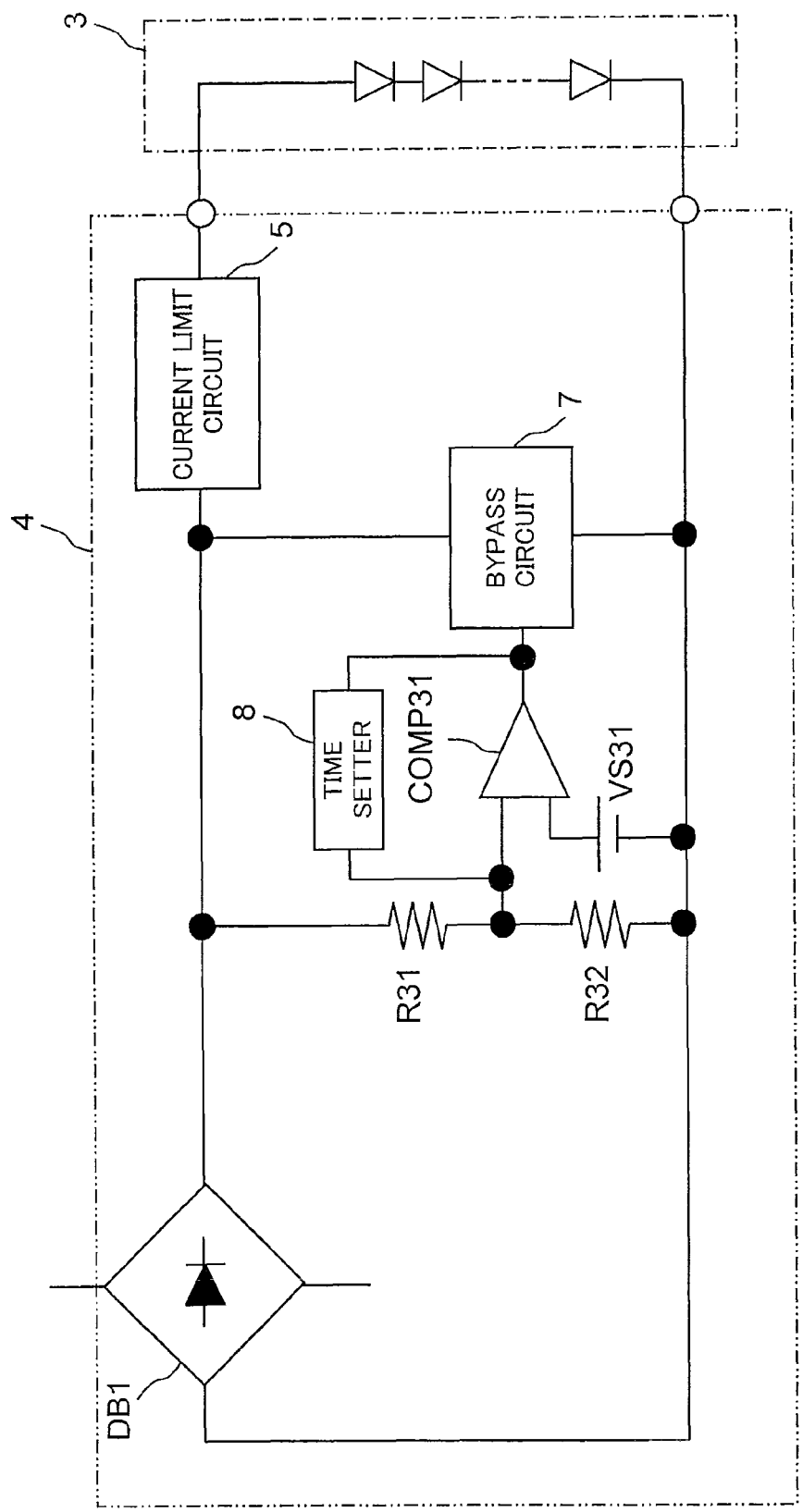
FIG. 3 is a diagram showing an example of the configuration shown in FIG. 2.

Next, an example of the configuration shown in FIG. 2 is shown in FIG. 3. In FIG. 3, the AC power source 1 and the phase-control light controller 2 are omitted from illustration. Division resistors R31 and R32, a comparator COMP31, a constant-voltage source VS31, and a time setter 8 constitute an example of the timing adjustment circuit 6 (see FIG. 2), and the division resistors R31 and R32 constitute an example of the voltage detection circuit 6A (see FIG. 2).

The comparator COMP31 compares the midpoint voltage of the division resistors R31 and R32 with the constant voltage outputted from the constant-voltage source VS31.

When the midpoint voltage of the division resistors R31 and R32 is lower than the constant voltage outputted from the constant-voltage source VS31, the output signal of the comparator COMP31 turns the bypass circuit 7 on, and thus the bypass circuit 7 extracts a current from the current supply line through which the LED drive current is supplied to the LED module 3. When the triac Tri1 in the phase-control light controller 2 turns on and the output voltage of the diode bridge DB1 rises, the source voltage is supplied to the comparator COMP31; thus, the comparator COMP31 starts to operate, and makes the bypass circuit 7 extract current. That is, immediately after the triac Tri1 turns on, the bypass circuit 7 starts to extract current.

By contrast, when the midpoint voltage of the division resistors R31 and R32 is equal to or higher than the constant voltage outputted from the constant-voltage source VS31, in principle, the output signal of the comparator COMP31 turns the bypass circuit 7 off, and thus the bypass circuit 7 does not extract a current from the current supply line through which the LED drive current is supplied to the LED module 3. However, when the triac Tri1 in the phase-control light controller 2 turns on and the output voltage of the diode bridge DB1 rises, after the midpoint voltage of the division resistors R31 and R32 is detected to be higher than the constant voltage outputted from the constant-voltage source VS31 until the time by the time setter 8, the bypass circuit 7 extracts current, and after the time set by the time setter 8 has elapsed, the bypass circuit 7 turns off.

By varying the resistance ratio of the division resistors R31 and R32, it is possible to vary the threshold voltage of the comparator COMP31, and thereby to vary the timing with which the bypass circuit 7 turns from on to off. However, when the triac Tri1 in the phase-control light controller 2 conducts abruptly, the bypass circuit 7 turns on and immediately turns off; thus, if the time setter 8 is not provided, the bypass circuit 7 can only extract current for a short period.

The time setter 8 produces a delay in the progress of, after the bypass circuit 7 turns on, the midpoint voltage of the division resistors R31 and R32 becoming equal to or higher than the constant voltage outputted from the constant-voltage source VS31 and turning the bypass circuit 7 off. With this delay, when the triac Tri1 in the phase-control light controller 2 turns on and the output voltage of the diode bridge DB1 rises quickly, the bypass circuit 7 extracts current at a predetermined current value for a predetermined period, and thereby prevents the triac Tri1 in the phase-control light controller 2 from turning off for a period corresponding to several cycles of the undulation wavelength at which the current passing through the triac Tri1 undulates.

In the comparator COMP31, the threshold voltage is the same between when the midpoint voltage of the division resistors R31 and R32 turns from lower to higher than the constant voltage outputted from the constant-voltage source VS31 and when the midpoint voltage of the division resistors R31 and R32 turns from higher to lower than the constant voltage outputted from the constant-voltage source VS31. Thus, also when the AC voltage outputted from the AC power source 1 is in the middle of falling from its peak voltage of 141 V to 0 V, the bypass circuit 7 may turn on and cause a current that does not contribute to the lighting of the LED module 3 to pass through the bypass circuit 7. This can be avoided by the use of, instead of the comparator COMP31, a comparator with hysteresis such that the threshold voltage when the midpoint voltage of the division resistors R31 and R32 turns from higher to lower than the constant voltage outputted from the constant-voltage source VS31 is lower than the threshold voltage when the midpoint voltage of the division resistors R31 and R32 turns from lower to higher than the constant voltage outputted from the constant-voltage source VS31. This prevents the bypass circuit 7 from turning on when the AC voltage outputted from the AC power source 1 is in the middle of falling from its peak voltage of 141 V to 0 V, and thus prevents a current that does not contribute to the lighting of the LED module 3 from passing trough the bypass circuit 7. Thus, higher power efficiency is achieved.

Embodiment 4

Figure 4A:
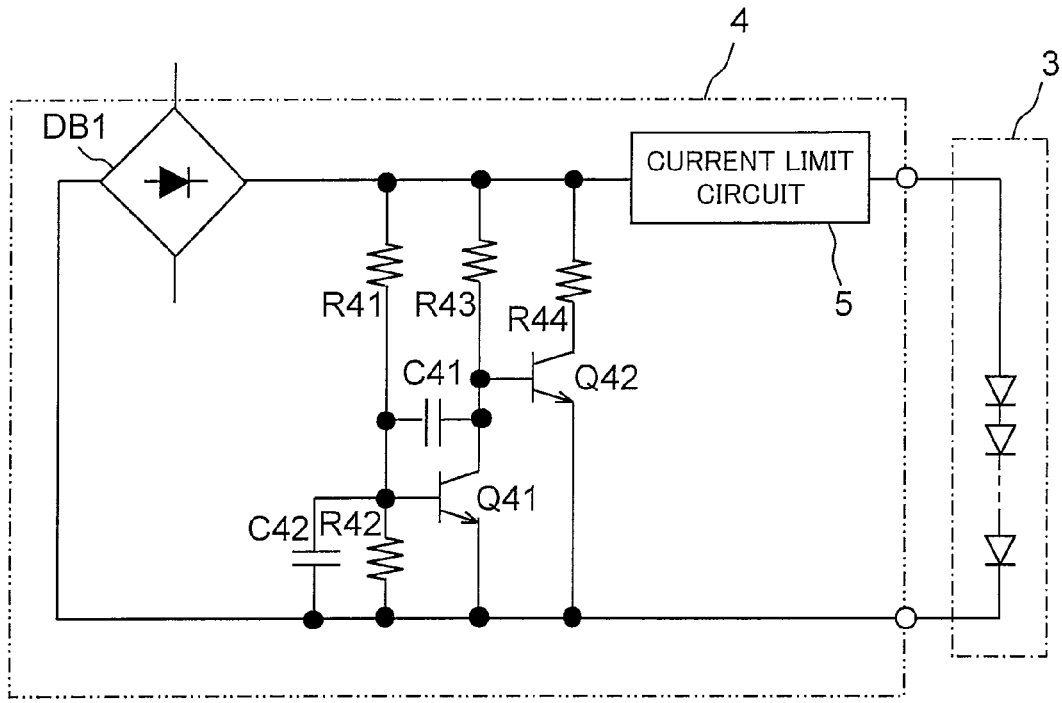
FIG. 4A is a diagram showing a specific example of the configuration shown in FIG. 3.

Next, a specific example of the configuration shown in FIG. 3 is shown in FIG. 4A. In FIG. 4A, the AC power source 1 and the phase-control light controller 2 are omitted from illustration. Division resistors R41 and R42 correspond to the division resistors R31 and R32 (FIG. 3). The division resistors R41 and R42 constitute a voltage detection circuit. A transistor Q41 of which the base is connected to the output of the voltage detection circuit and of which the emitter is connected to the negative-side output of the diode bridge DB1, and a resistor R43 connected between the collector of the transistor Q41 and the positive-side output of the diode bridge DB1, constitute an example of the comparator COMP31 and the constant-voltage source VS31 (see FIG. 3). The base-emitter voltage of the transistor Q41 is equivalent to the output voltage of the constant-voltage source VS31. A transistor Q42 of which the base is connected to the collector of the transistor Q41 and of which the emitter is connected to the negative-side output of the diode bridge DB1, and a resistor R44 connected between the collector of the transistor Q42 and the positive-side output of the diode bridge DB1, constitute an example of the bypass circuit 7 (see FIG. 3). A capacitor C41 connected between the bases of the transistors Q41 and Q42 constitutes an example of the time setter 8 (see FIG. 3). Furthermore, a capacitor 42 for preventing malfunctioning caused by noise is connected between the base of the transistor Q41 and the negative-side output of the diode bridge DB1.

While the midpoint voltage of the division resistors R41 and R42 is lower than the base-emitter voltage of the transistor Q41, the transistor Q41 remains off; accordingly, a current is supplied via the resistor R43 to the base of the transistor Q42, and thus the transistor Q42 remains on. As a result, the transistor Q42 extracts a current from the output of the diode bridge DB1 via the resistor R44, at a predetermined current value. By contrast, while the midpoint voltage of the division resistors R41 and R42 is equal to or higher than the base-emitter voltage of the transistor Q41, the transistor Q41 remains on; accordingly, no current is supplied to the base of the transistor Q42, and thus the transistor Q42 remains off.

Here, when the triac Tri1 in the phase-control light controller 2 conducts abruptly, the transistor Q42 turns on, and immediately the transistor Q41 turns on and then the transistor Q42 turns off. Thus, if the capacitor C41 is not provided, the bypass circuit constituted by the resistor R44 and the transistor Q42 can only extract current for a short period.

By correctly setting the capacitance value of the capacitor C41, a delay is produced in the progress of, after the transistor Q42 turns on, the midpoint voltage of the division resistors R41 and R42 becoming equal to or higher than the base-emitter voltage of the transistor Q42 and causing the transistor Q41 to turn on and the transistor Q42 to turn off. With this delay, when the triac Tri1 in the phase-control light controller 2 turns on and the output voltage of the diode bridge DB1 rises quickly, the bypass circuit constituted by the resistor R44 and the transistor Q42 extracts current at a predetermined current value for a predetermined period, and thereby prevents the triac Tri1 in the phase-control light controller 2 from turning off for a period corresponding to several cycles of the undulation wavelength at which the current passing through the triac Tri1 undulates.

Embodiment 5

Figure 4B:
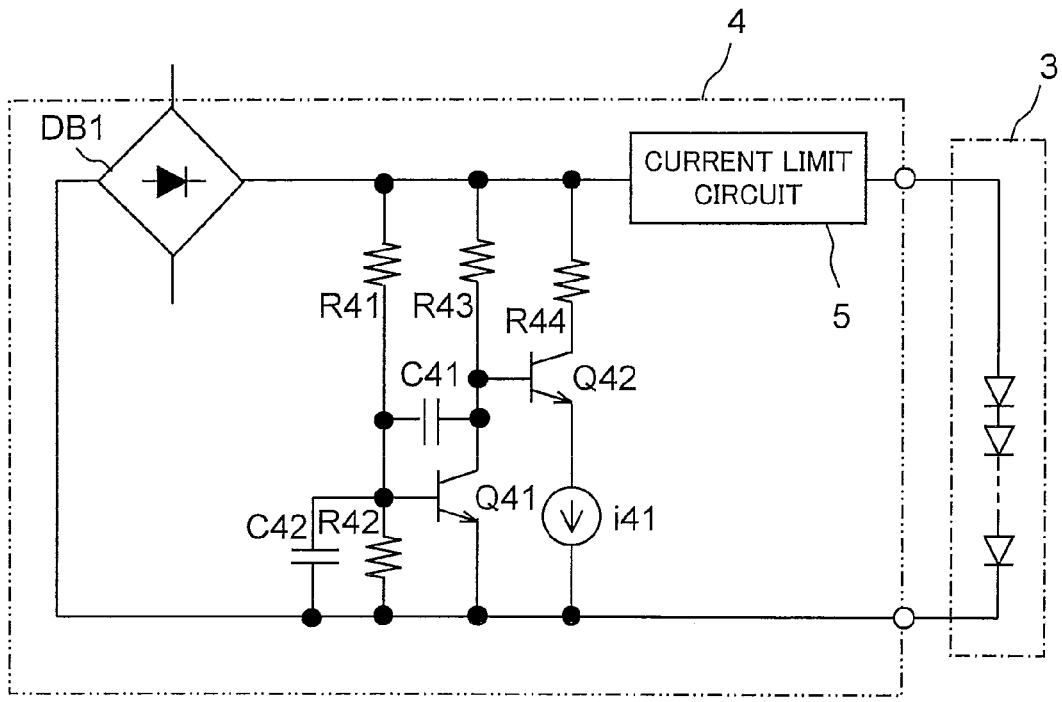
FIG. 4B is a diagram showing another specific example of the configuration shown in FIG. 3.

Next, another specific example of the configuration shown in FIG. 3 is shown in FIG. 4B. In FIG. 4B, the AC power source 1 and the phase-control light controller 2 are omitted from illustration.

As compared with the configuration shown in FIG. 4A, the configuration shown in FIG. 4B is additionally provided with a constant-current source i41. The constant-current source i41 is connected between the emitter of the transistor Q42 and the negative-side output of the diode bridge DB1. The resistor R44, the transistor Q42, and the constant-current source i41 constitute an example of the bypass circuit 7 (see FIG. 3).

Also in the configuration shown in FIG. 4A, basically, the bypass circuit extracts current at a predetermined current value; however, for example, when the source voltage of the AC power source 1 varies, the current value of the bypass circuit varies. By contrast, in the configuration shown in FIG. 4B, since the constant-current source i41 is provided, even when, for example, the source voltage of the AC power source 1 varies, the current value of the bypass circuit can be kept constant. Moreover, when the resistance values of the individual resistors and the amplification factors of the individual transistors are sufficient, the current value of the bypass circuit can be changed by the constant-current source i41.

Examples of Operating Waveforms in Embodiments 2 to 5

Examples of the operating waveforms in the LED lighting systems shown in FIGS. 2 to 4 are shown in FIGS. 5A, 5B, 6A, 6B, and 6C.

Figure 5A:
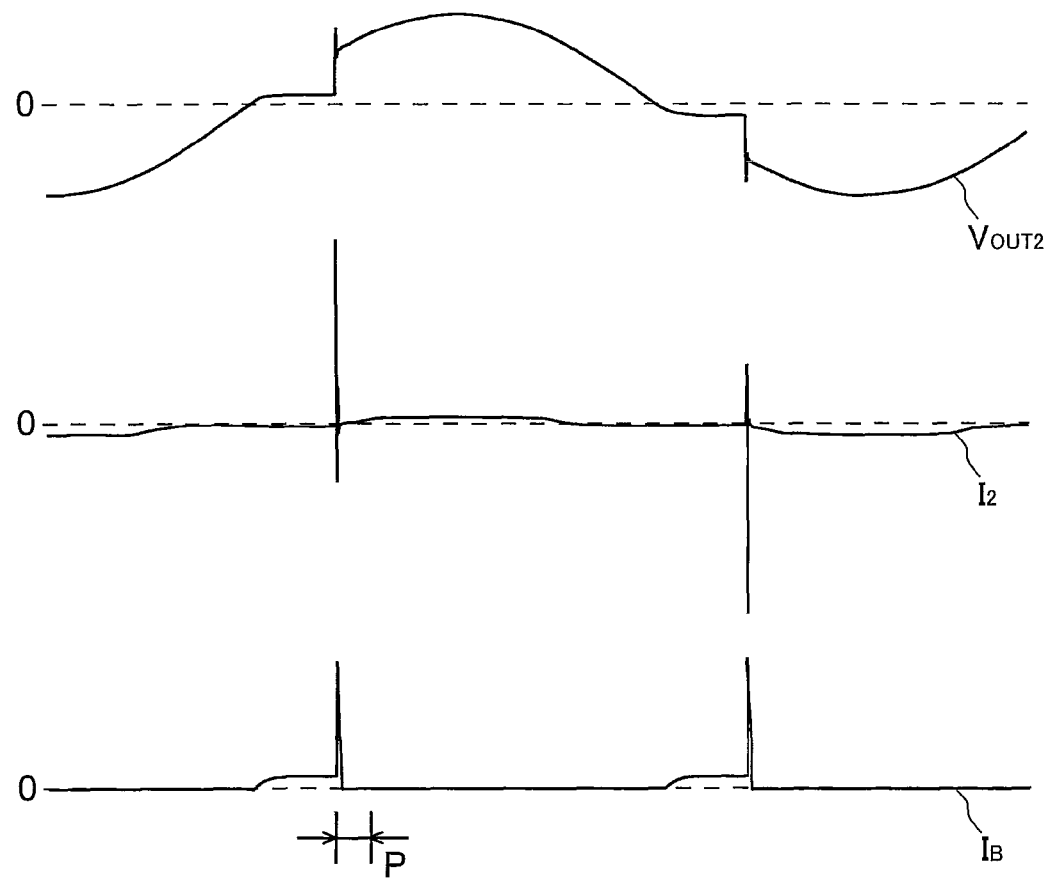
FIG. 5A is a diagram showing an example of operating waveforms in the LED lighting systems shown in FIGS. 2 to 4.
Figure 5B:
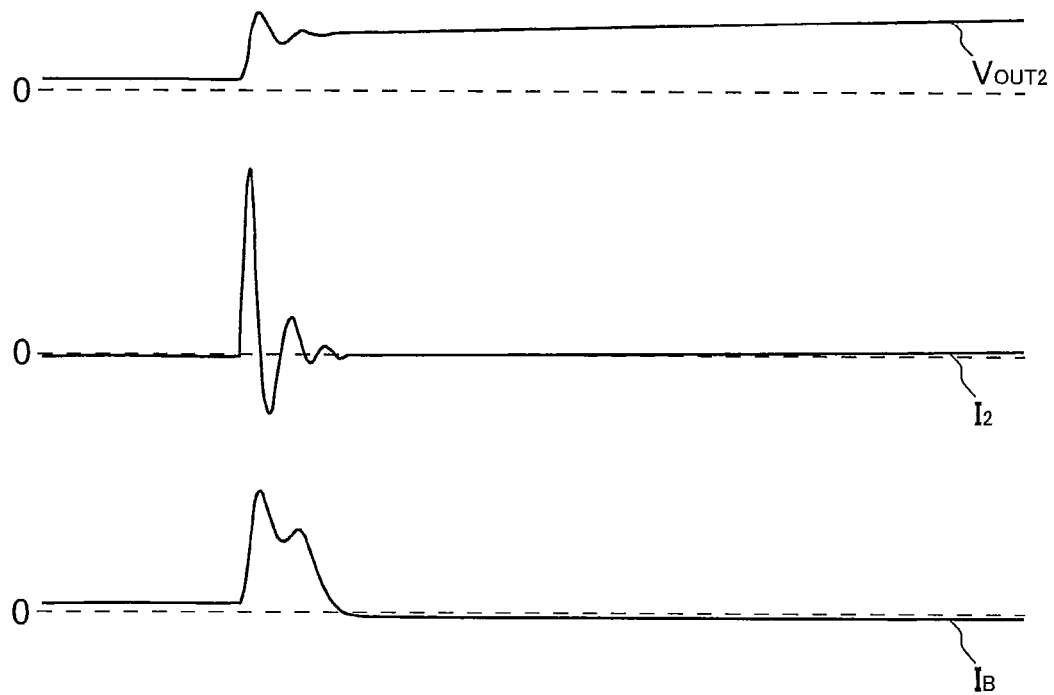
FIG. 5B is an enlarged diagram of part of FIG. 5A.

The waveform of the output voltage $V_{OUT2}$ of the phase-control light controller 2, the waveform of the current $I_2$ passing through the triac Tri1 in the phase-control light controller 2, and the waveform of the current $I_B$ passing through the bypass circuit are shown in FIG. 5A, and an enlarged diagram of the period P in FIG. 5A is shown in FIG. 5B. FIGS. 5A and 5B show that the triac Tri1 remains in the on state even after the current passing through the triac Tri1 undulates.

Figure 6A:
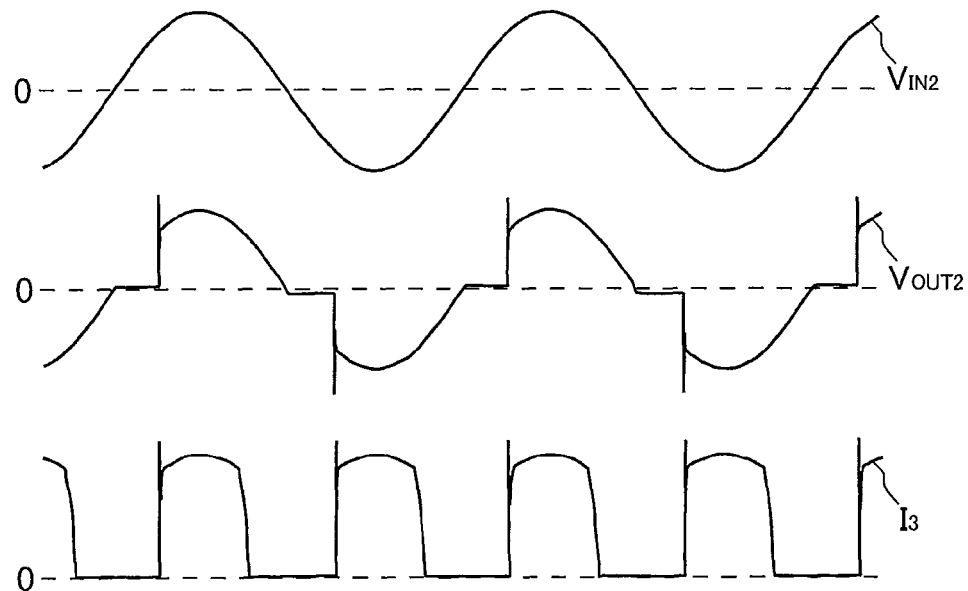
FIG. 6A is a diagram showing an example of operating waveforms in the LED lighting systems shown in FIGS. 2 to 4.
Figure 6B:
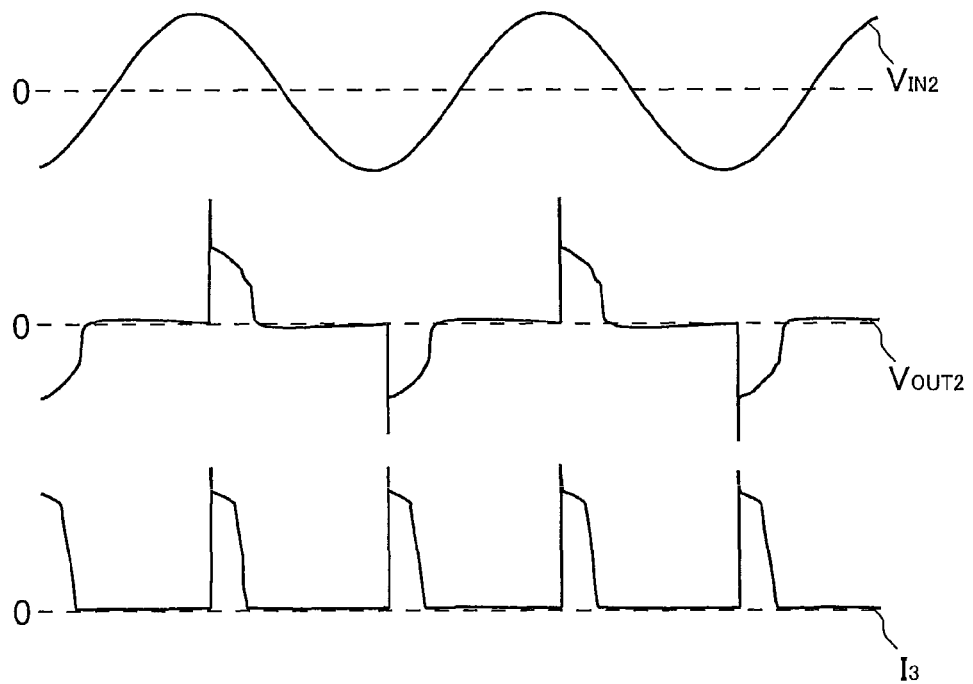
FIG. 6B is a diagram showing an example of operating waveforms in the LED lighting systems shown in FIGS. 2 to 4.
Figure 6C:
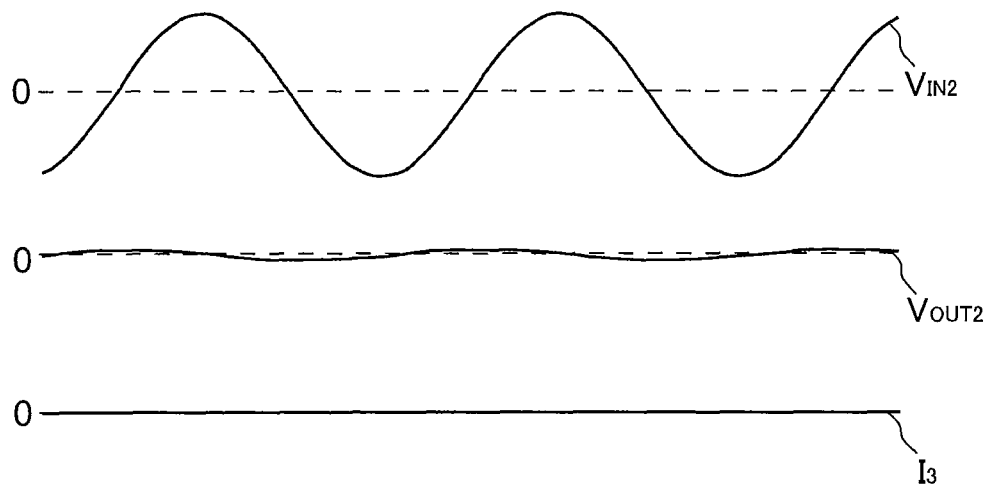
FIG. 6C is a diagram showing an example of operating waveforms in the LED lighting systems shown in FIGS. 2 to 4.

FIG. 6A shows the waveforms when the light is controlled to be 100% (no delay in phase), FIG. 6B shows the waveforms when the light is controlled to be medium (a medium delay in phase), and FIG. 6C shows the waveforms when the light is controlled to be 0% (the maximum delay in phase), that is, when the light is off. In FIGS. 6A, 6B, and 6C, $V_{IN2}$, $V_{OUT2}$, and $I_3$ respectively indicate the waveform of the input voltage to the phase-control light controller 2, the waveform of the output voltage of the phase-control light controller 2, and the waveform of the current passing through the LED module 3.

Embodiment 6

Figure 7:
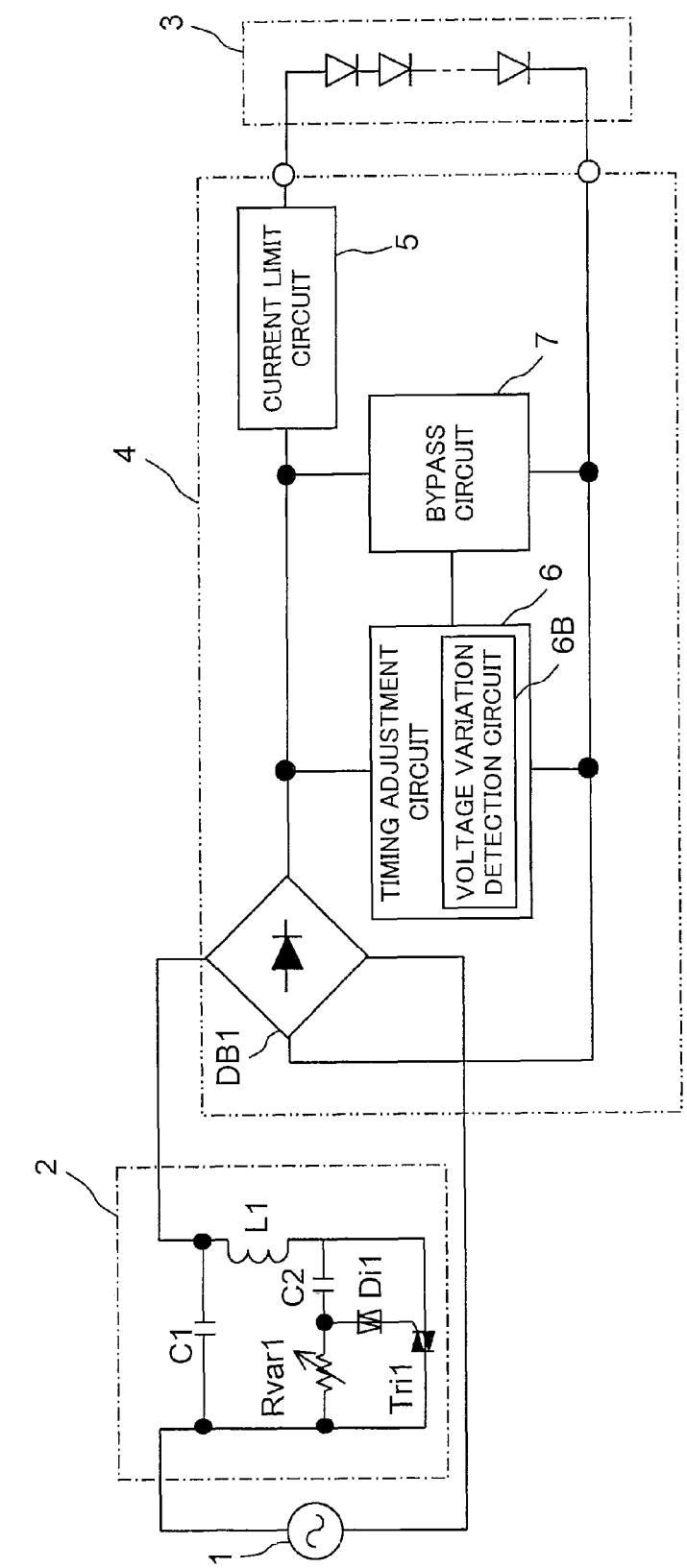
FIG. 7 is a diagram showing another embodiment of the LED lighting system shown in FIG. 1.

Next, another embodiment of the LED lighting system shown in FIG. 1 is shown in FIG. 7. In the configuration shown in FIG. 7, the timing adjustment circuit 6 includes a voltage variation detection circuit 6B which detects a variation in the output voltage of the diode bridge DB1, and according to the variation in the output voltage of the diode bridge DB1 as detected by the voltage variation detection circuit 6B, the current extraction start timing and the current extraction duration are adjusted.

Embodiment 7

Figure 8:
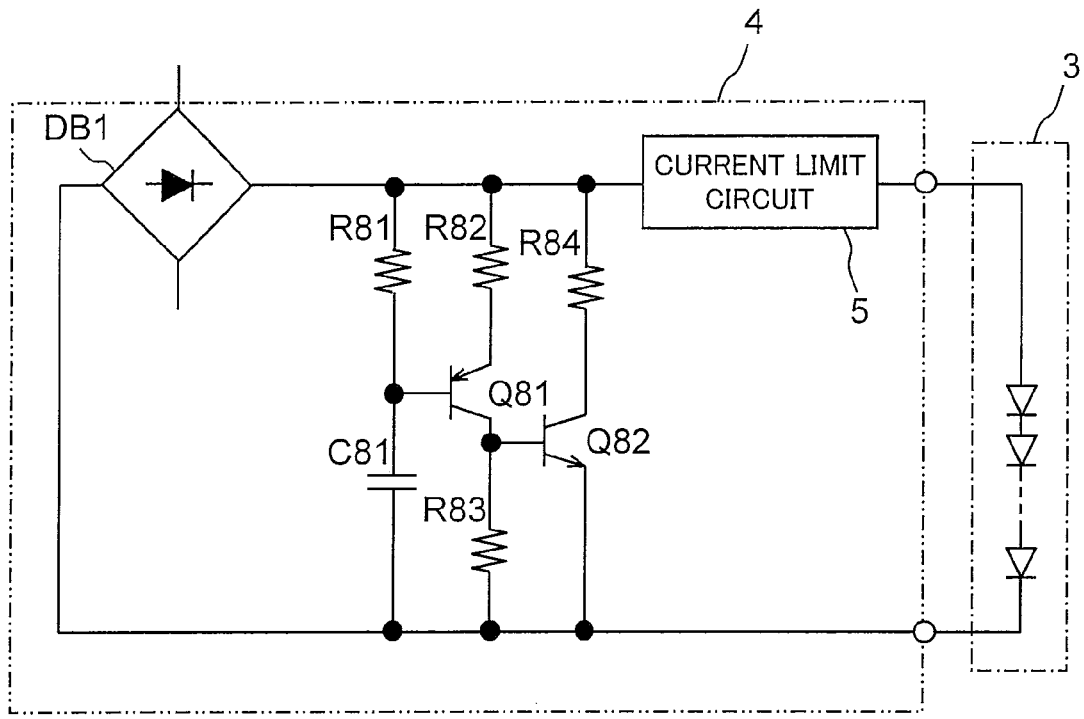
FIG. 8 is a diagram showing a specific example of the configuration shown in FIG. 7.

Next, a specific example of the configuration shown in FIG. 7 is shown in FIG. 8. In FIG. 8, the AC power source 1 and the phase-control light controller 2 are omitted from illustration. A serial circuit of a resistor R81 and a capacitor C81 constitutes an example of the voltage variation detection circuit 6B (see FIG. 7). One end of the resistor R81 is connected to the positive-side output of the diode bridge DB1, and one end of the capacitor C81 is connected to the negative-side output of the diode bridge DB1. The serial circuit of the resistor R81 and the capacitor C81, a transistor Q81 of which the base is connected to the node between the resistor R81 and the capacitor C81, a resistor R82 connected between the emitter of the transistor Q81 and the positive-side output of the diode bridge DB1, and a resistor R83 connected between the collector of the transistor Q81 and the negative-side output of the diode bridge DB1 constitute an example of the timing adjustment circuit 6 (see FIG. 7). A transistor Q82 of which the base is connected to the collector of the transistor Q81 and of which the emitter is connected to the negative-side output of the diode bridge DB1, and a resistor R84 connected between the collector of the transistor Q82 and the positive-side output of the diode bridge DB1, constitute an example of the bypass circuit 7 (see FIG. 7).

When the triac Tri1 in the phase-control light controller 2 turns on and the output voltage of the diode bridge DB1 rises, a pulse current passes through the capacitor C81; using this pulse current as its base current, the transistor Q81 turns on; using the collector current of the transistor Q81 as its base current, the transistor Q82 turns on. Thus, during the period in which the just-mentioned pulse current is passing, the bypass circuit constituted by the transistor Q82 and the resistor R84 extracts a current from the output of the diode bridge DB1.

By varying the capacitance value of the capacitor C81, it is possible to vary the pulse width of the pulse current. By varying the resistance values of the individual resistors with consideration given to the amplification factors of the individual transistors, it is possible to vary the current value of the pulse current.

Thus, when the triac Tri1 in the phase-control light controller 2 turns on and the output voltage of the diode bridge DB1 rises quickly, the bypass circuit constituted by the transistor Q82 and the resistor R84 extracts current at a predetermined current value for a predetermined period, and thereby prevents the triac Tri1 in the phase-control light controller 2 from turning off for a period corresponding to several cycles of the undulation wavelength at which the current passing through the triac Tri1 undulates.

Embodiment 8

Figure 9:
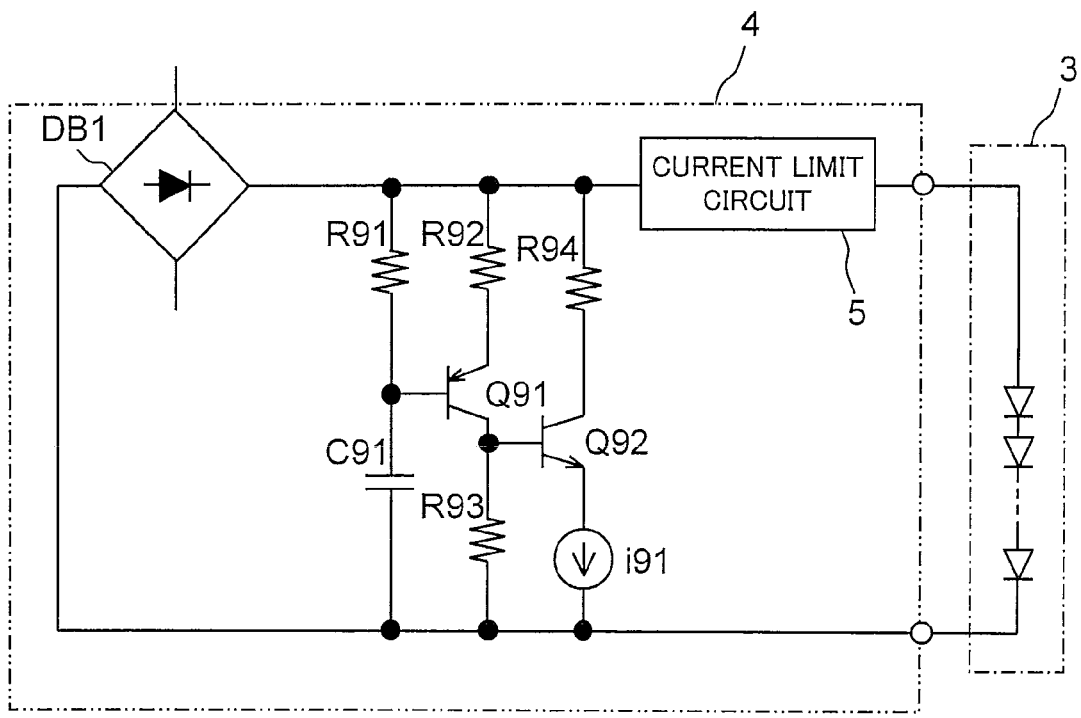
FIG. 9 is a diagram showing another specific example of the configuration shown in FIG. 7.

Next, another specific example of the configuration shown in FIG. 7 is shown in FIG. 9. In FIG. 9, the AC power source 1 and the phase-control light controller 2 are omitted from illustration.

As compared with the configuration shown in FIG. 8, the configuration shown in FIG. 9 is additionally provided with a constant-current source i91. Accordingly, the resistors R91 to R94, the capacitor C91, and the transistors Q91 to Q92 here respectively correspond to the resistors R81 to R84, the capacitor C81, and the transistors Q81 to Q82. The constant-current source i91 is connected between the emitter of the transistor Q92 and the negative-side output of the diode bridge DB1. The resistor R94, the transistor Q92, and the constant-current source i91 constitute an example of the bypass circuit 7 (see FIG. 7).

Also in the configuration shown in FIG. 8, basically, the bypass circuit extracts current at a predetermined current value; however, for example, when the source voltage of the AC power source 1 varies, the current value of the bypass circuit varies. By contrast, in the configuration shown in FIG. 9, since the constant-current source i91 is provided, even when, for example, the source voltage of the AC power source 1 varies, the current value of the bypass circuit can be kept constant. Moreover, when the resistance values of the individual resistors and the amplification factors of the individual transistors are sufficient, the current value of the bypass circuit can be changed by the constant-current source i91.

Embodiment 9

Figure 10:
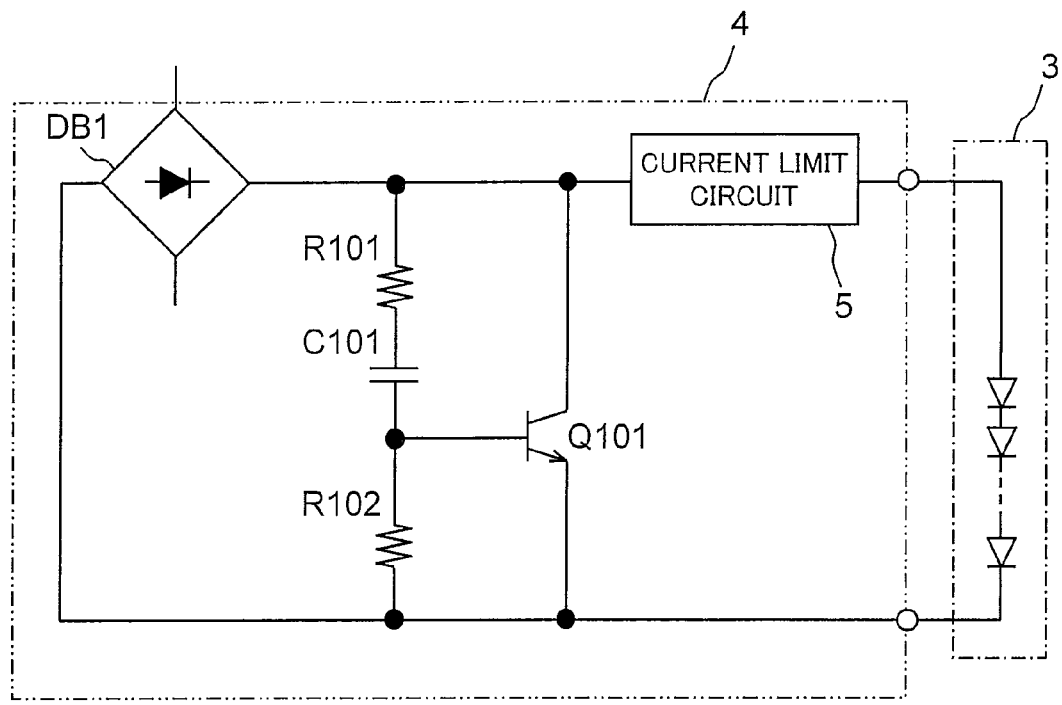
FIG. 10 is a diagram showing yet another specific example of the configuration shown in FIG. 7.

Next, yet another specific example of the configuration shown in FIG. 7 is shown in FIG. 10. In FIG. 10, the AC power source 1 and the phase-control light controller 2 are omitted from illustration.

A serial circuit of a resistor R101, a resistor R102, and a capacitor C101 constitutes an example of the timing adjustment circuit 6 and the voltage variation detection circuit 6B (see FIG. 7). One end of the resistor R101 is connected to the positive-side output of the diode bridge DB1, and one end of the resistor R102 is connected to the negative-side output of the diode bridge DB1. The capacitor C101 is connected between the resistors R101 and R102. A transistor Q101 of which the base is connected to the node between the capacitor C101 and the resistor R102, of which the collector is connected to the positive-side output of the diode bridge DB1, and of which the emitter is connected to the negative-side output of the diode bridge DB1 constitutes an example of the bypass circuit 7 (see FIG. 7).

When the triac Tri1 in the phase-control light controller 2 turns on and the output voltage of the diode bridge DB1 rises, a pulse current passes through the capacitor C101; using this pulse current as its base current, the transistor Q101 turns on. Thus, during the period in which the just-mentioned pulse current is passing, the bypass circuit constituted by the transistor Q101 extracts a current from the output of the diode bridge DB1.

By varying the capacitance value of the capacitor C101, it is possible to vary the pulse width of the pulse current. By varying the resistance values of the individual resistors with consideration given to the amplification factor of the transistor Q101, it is possible to vary the current value of the pulse current.

Thus, when the triac Tri1 in the phase-control light controller 2 turns on and the output voltage of the diode bridge DB1 rises quickly, the bypass circuit constituted by the transistor Q101 extracts current at a predetermined current value for a predetermined period, and thereby prevents the triac Tri1 in the phase-control light controller 2 from turning off for a period corresponding to several cycles of the undulation wavelength at which the current passing through the triac Tri1 undulates.

As distinct from the configuration shown in FIG. 8, the configuration shown in FIG. 10 achieves the amplification of the above-mentioned pulse current with a transistor in a single stage, hence with a very simply circuit configuration, and thus at low cost.

Embodiment 10

Figure 11:
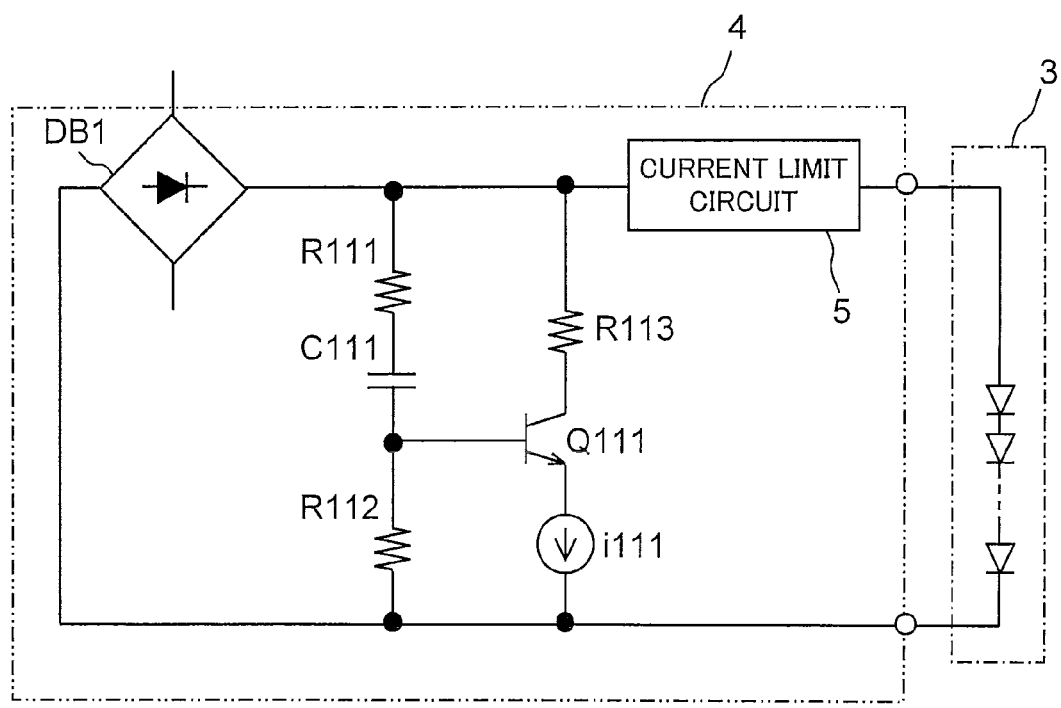
FIG. 11 is a diagram showing yet another specific example of the configuration shown in FIG. 7.

Next, yet another specific example of the configuration shown in FIG. 7 is shown in FIG. 11. In FIG. 11, the AC power source 1 and the phase-control light controller 2 are omitted from illustration.

As compared with the configuration shown in FIG. 10, the configuration shown in FIG. 11 is additionally provided with a resistor R113 and a constant-current source i111. Accordingly, the resistors R111 to R112, the capacitor C111, and the transistor Q111 here respectively correspond to the resistors R101 to R102, the capacitor C101, and the transistor Q101. The resistor R113 is connected between the collector of the transistor Q111 and the positive-side output of the diode bridge DB1. The constant-current source i111 is connected between the emitter of the transistor Q111 and the negative-side output of the diode bridge DB1. The resistor R113, the transistor Q111, and the constant-current source i111 constitute an example of the bypass circuit 7 (see FIG. 7).

Also in the configuration shown in FIG. 10, basically, the bypass circuit extracts current at a predetermined current value; however, for example, when the source voltage of the AC power source 1 varies, the current value of the bypass circuit varies. By contrast, in the configuration shown in FIG. 11, since the constant-current source i111 is provided, even when, for example, the source voltage of the AC power source 1 varies, the current value of the bypass circuit can be kept constant. Moreover, when the resistance values of the individual resistors and the amplification factor of the transistor Q111 are sufficient, the current value of the bypass circuit can be changed by the constant-current source i111.

As distinct from the configuration shown in FIG. 9, the configuration shown in FIG. 11 achieves the amplification of the above-mentioned pulse current with a transistor in a single stage, hence with a very simply circuit configuration, and thus at low cost.

Examples of Operating Waveforms in Embodiments 6 to 10

Figure 12A:
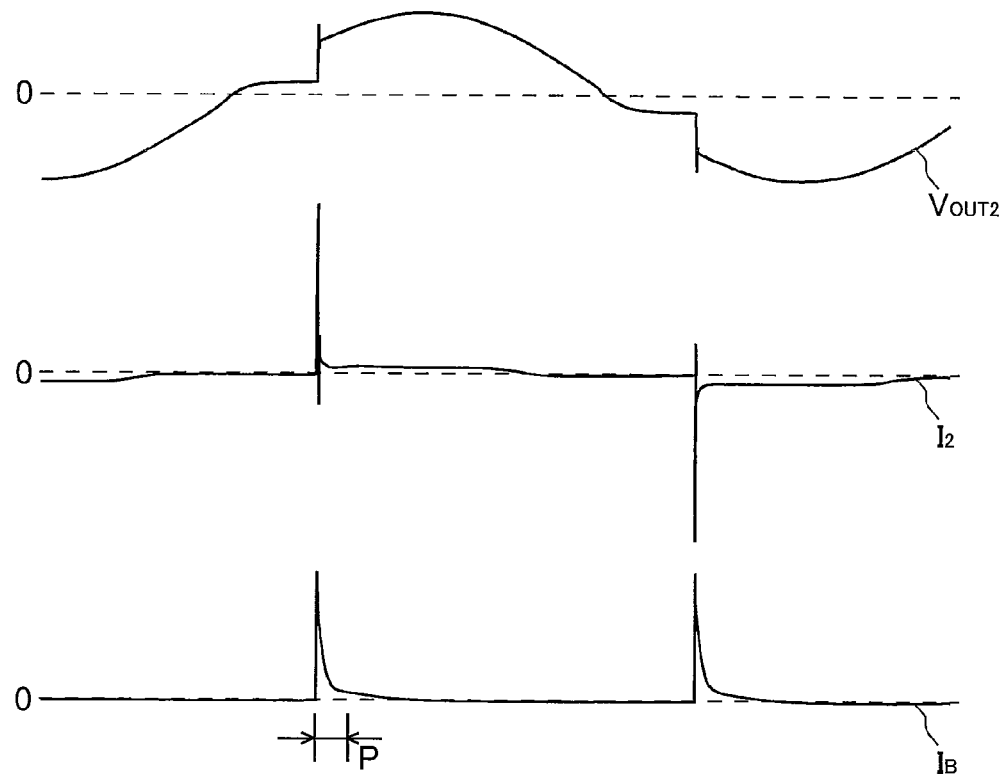
FIG. 12A is a diagram showing an example of operating waveforms in the LED lighting systems shown in FIGS. 7 to 11.
Figure 12B:
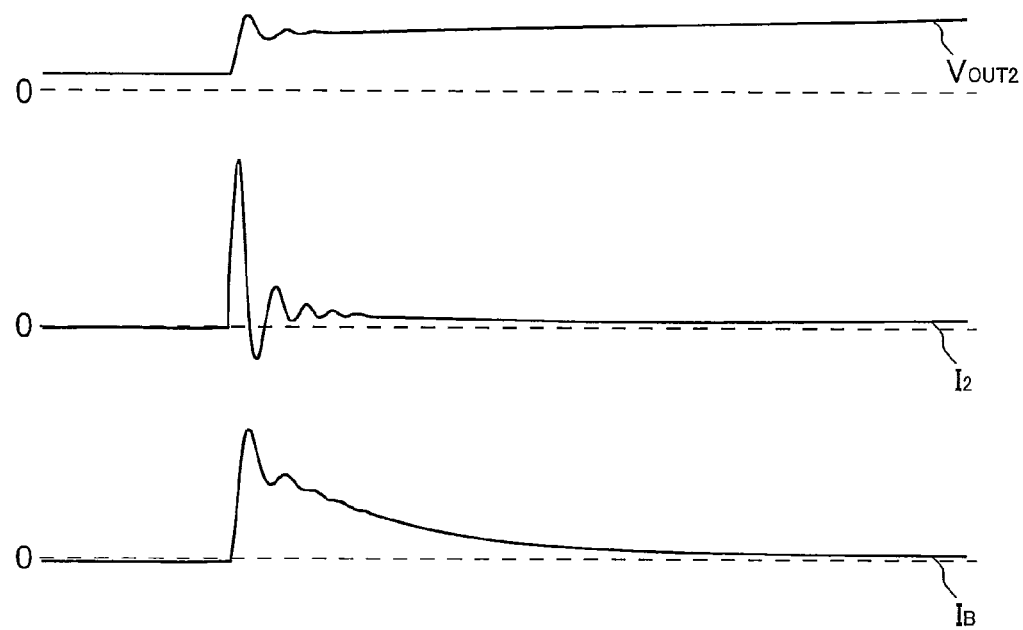
FIG. 12B is an enlarged diagram of part of FIG. 12A.

Examples of the operating waveforms in the LED lighting systems shown in FIGS. 7 to 11 are shown in FIGS. 12A and 12B. The waveform of the output voltage $V_{OUT2}$ of the phase-control light controller 2, the waveform of the current $I_2$ passing through the triac Tri1 in the phase-control light controller 2, and the waveform of the current $I_B$ passing through the bypass circuit are shown in FIG. 12A, and an enlarged diagram of the period P in FIG. 12A is shown in FIG. 12B. FIGS. 12A and 12B show that the triac Tri1 remains in the on state even after the current passing through the triac Tri1 undulates.

Embodiment 11

In controlling the light of an LED module in an LED lighting system by use of a phase-control light controller, just because LEDs are low-current-consumption devices, a triac in the phase-control light controller may fail to turn on normally. This inconvenience can be effectively overcome by either of the LED drive circuit shown in FIG. 2 and the LED drive circuit shown in FIG. 7.

In cases where a phase-control light controller is used, however, there is also the problem of an unnecessary current passing through an LED module 3 and causing it to light unnecessarily. Here, an unnecessary current denotes one that may be supplied to, but is unnecessary to, the LED module 3 during a period in which the LED module 3 needs to be kept from lighting. What counts as such here is the current that, when the triac in the phase-control light controller is off, originates from a capacitor forming a filter according to its capacitance value and the AC frequency.

In the LED drive circuit shown in FIG. 2, the timing adjustment circuit 6 and the bypass circuit 7 also function as a circuit capable of preventing the LEDs from being lit by an unnecessary current (an unnecessary lighting prevention circuit). This overcomes the problem of the LEDs lighting unnecessarily.

By contrast, in the LED drive circuit shown in FIG. 7, the timing adjustment circuit 6 and the bypass circuit 7 do not function as a circuit capable of preventing the LEDs from being lit by an unnecessary current (an unnecessary lighting prevention circuit). Thus, to overcome the problem of the LEDs lighting unnecessarily, it is necessary to provide an unnecessary lighting prevention circuit separately.

Figure 13:
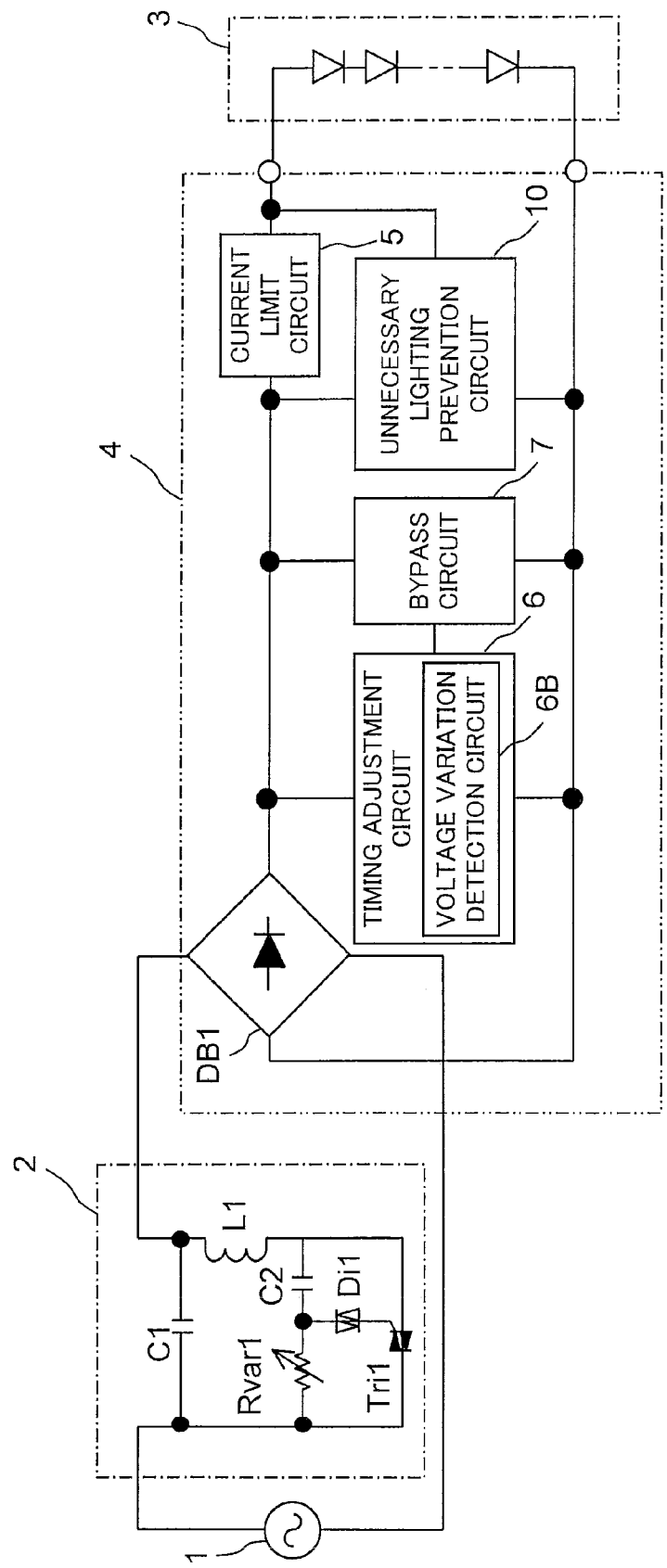
FIG. 13 is a diagram showing an LED lighting system according to the invention, obtained by additionally providing the configuration shown in FIG. 7 with an unnecessary lighting prevention circuit.

Additionally providing the LED drive circuit shown in FIG. 7 with an unnecessary lighting prevention circuit 10 gives a configuration as shown in FIG. 13. The unnecessary lighting prevention circuit 10 is provided with a current extractor (unillustrated) which extracts a current from the current supply line through which the LED drive current is supplied to the LED module 3. When the input current to the LED drive circuit according to the invention is an unnecessary current, through the current extraction by the current extractor, the LED module 3 is prevented from lighting. Preferably, the unnecessary lighting prevention circuit 10 is provided with a function of making the current extractor extract a smaller amount of current when the input current to the LED drive circuit according to the invention is switched from an unnecessary current to the LED drive current. The LED drive current denotes the current that is supplied to the LED module 3 during a period in which the LED module 3 needs to be lighting. Now, specific examples of the unnecessary lighting prevention circuit 10 will be described.

Example 1 of Unnecessary Lighting Prevention Circuit

Figure 19:
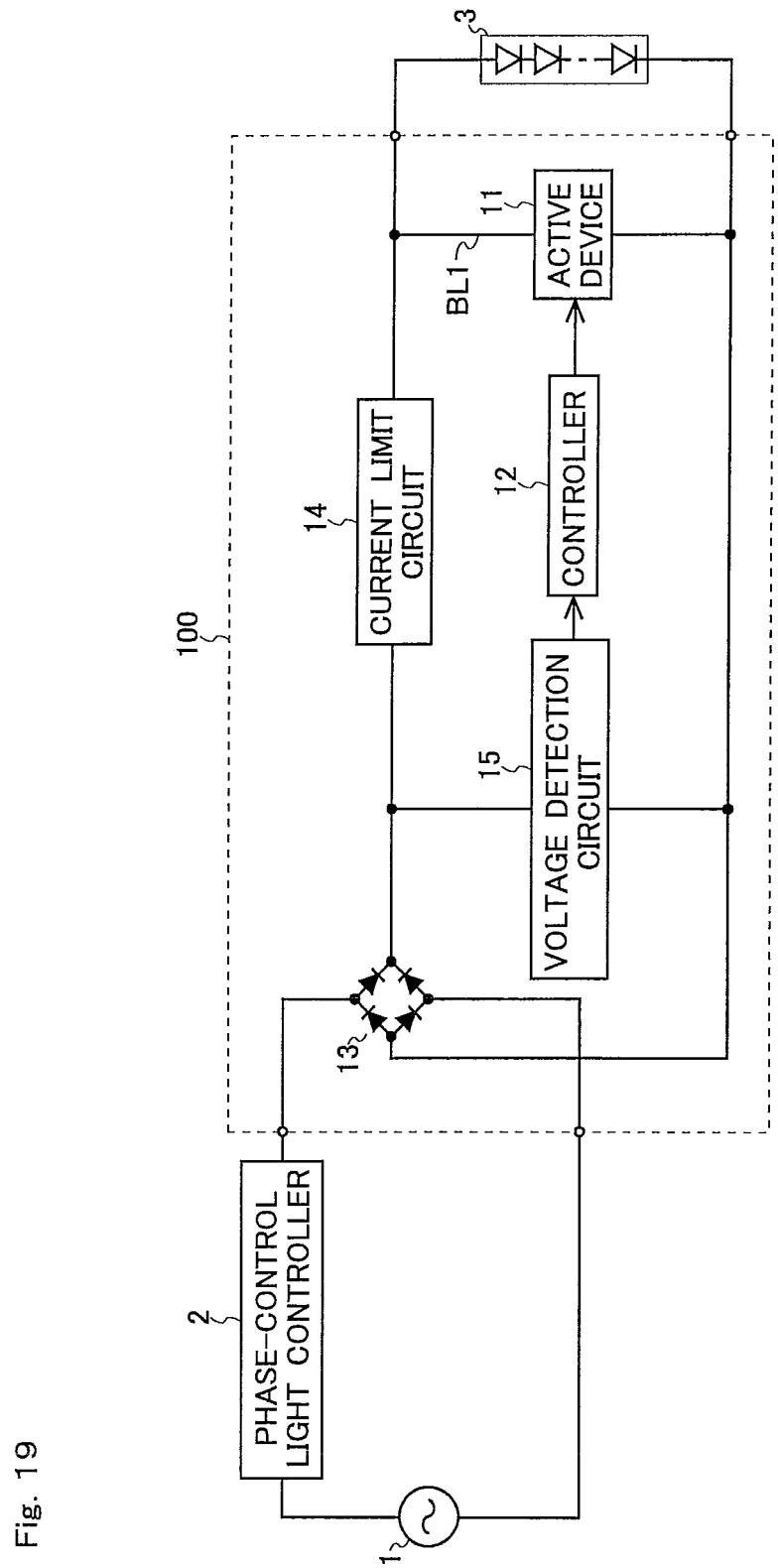
FIG. 19 is a diagram showing the configuration of an LED lighting system provided with an unnecessary lighting prevention circuit of Example 1.

Example 1 of the unnecessary lighting prevention circuit 10 is shown in FIG. 19. Removing the diode bridge 13 and the current limit circuit 14 from the LED drive circuit 100 leaves what corresponds to Example 1 of the unnecessary lighting prevention circuit 10.

In the LED lighting system shown in FIG. 19, the LED drive circuit 100 is provided with a diode bridge 13 which rectifies the input voltage to the LED drive circuit 100, a current limit circuit 14 which limits the current passing through the LED module 3, and a voltage detection circuit 15 which monitors the output voltage of the diode bridge 13. The voltage outputted from the AC power source 1 and then phase-controlled by the phase-control light controller 2 is full-wave-rectified by the diode bridge 13, and is then applied via the current limit circuit 14 to the LED module 3. According to the result of the monitoring by the voltage detection circuit 15, a controller 12 turns on and off an active device 11.

Figure 20:
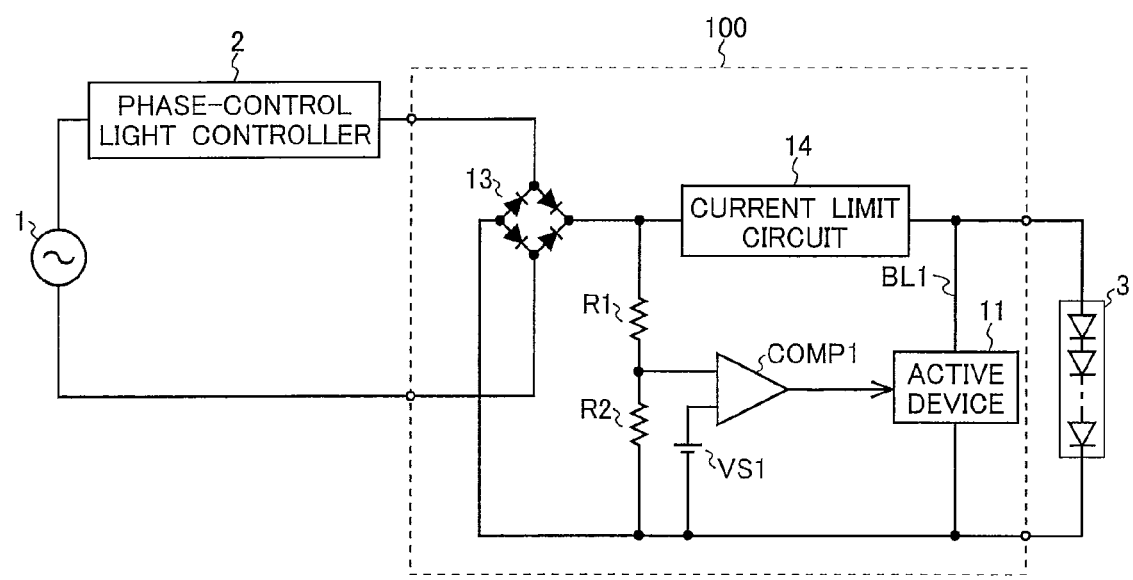
FIG. 20 is a diagram showing a specific example of the LED lighting system shown in FIG. 19.

Next, a specific example of the LED lighting system shown in FIG. 19 is shown in FIG. 20. In FIG. 20, the voltage detection circuit 15 is composed of division resistors R1 and R2, and the controller 12 is composed of a comparator COMP1 and a constant-voltage source VS1.

The comparator COMP1 compares the midpoint voltage of the division resistors R1 and R2 with the constant voltage outputted from the constant-voltage source VS1. While the midpoint voltage of the division resistors R1 and R2 is lower than the constant voltage outputted from the constant-voltage source VS1, the comparator COMP1 keeps the active device 11 on so that no leak current passes through the LED module 3, and thereby prevents the LED module 3 from lighting. While the midpoint voltage of the division resistors R1 and R2 is equal to or higher than the constant voltage outputted from the constant-voltage source VS1, the comparator COMP1 keeps the active device 11 off so that no current passes through a bypass line BL1.

By varying the resistance ratio of the division resistors R1 and R2, it is possible to vary the threshold voltage of the comparator COMP1, and thereby to vary the timing with which the active device 11 turns on and off.

Figure 21:
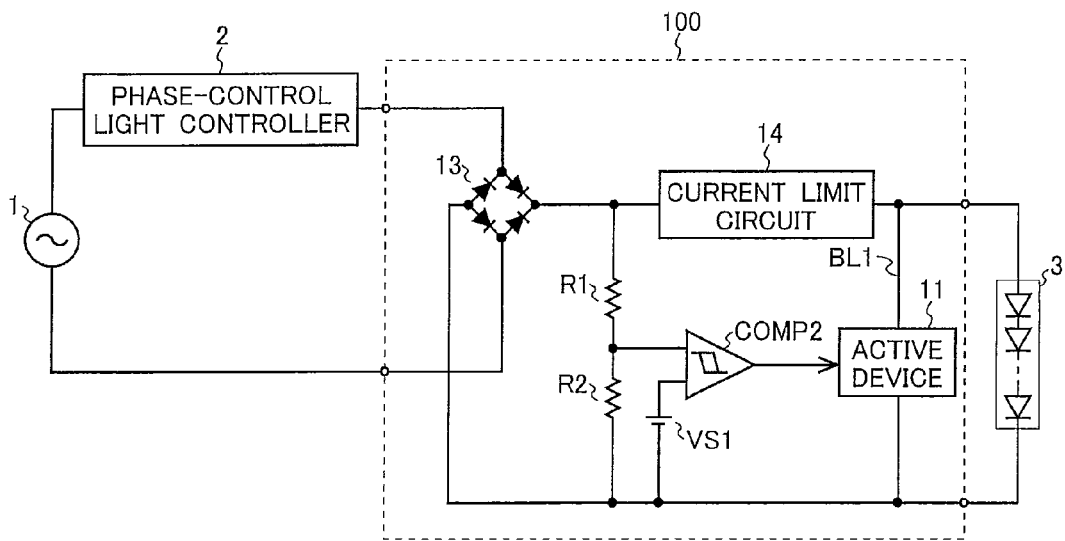
FIG. 21 is a diagram showing a configuration obtained by replacing the comparator in the LED lighting system shown in FIG. 20 with a comparator with hysteresis.

In the comparator COMP1, the threshold voltage is the same between when the midpoint voltage of the division resistors R1 and R2 turns from lower to higher than the constant voltage outputted from the constant-voltage source VS1 and when the midpoint voltage of the division resistors R1 and R2 turns from higher to lower than the constant voltage outputted from the constant-voltage source VS1. Thus, when the AC voltage outputted from the AC power source 1 is in the middle of falling from its peak voltage of 141 V to 0 V, the active device 11 may turn on and cause a current that does not contribute to the lighting of the LED module 3 to pass through the bypass line BL1. This can be avoided by the use of, instead of the comparator COMP1, a comparator COMP2 with hysteresis as shown in FIG. 21 such that the threshold voltage when the midpoint voltage of the division resistors R1 and R2 turns from higher to lower than the constant voltage outputted from the constant-voltage source VS1 is lower than the threshold voltage when the midpoint voltage of the division resistors R1 and R2 turns from lower to higher than the constant voltage outputted from the constant-voltage source VS1. This prevents the active device 11 from turning on when the AC voltage outputted from the AC power source 1 is in the middle of falling from its peak voltage of 141 V to 0 V, and thus prevents a current that does not contribute to the lighting of the LED module 3 from passing trough the bypass line BL1. Thus, higher power efficiency is achieved.

Figure 22:
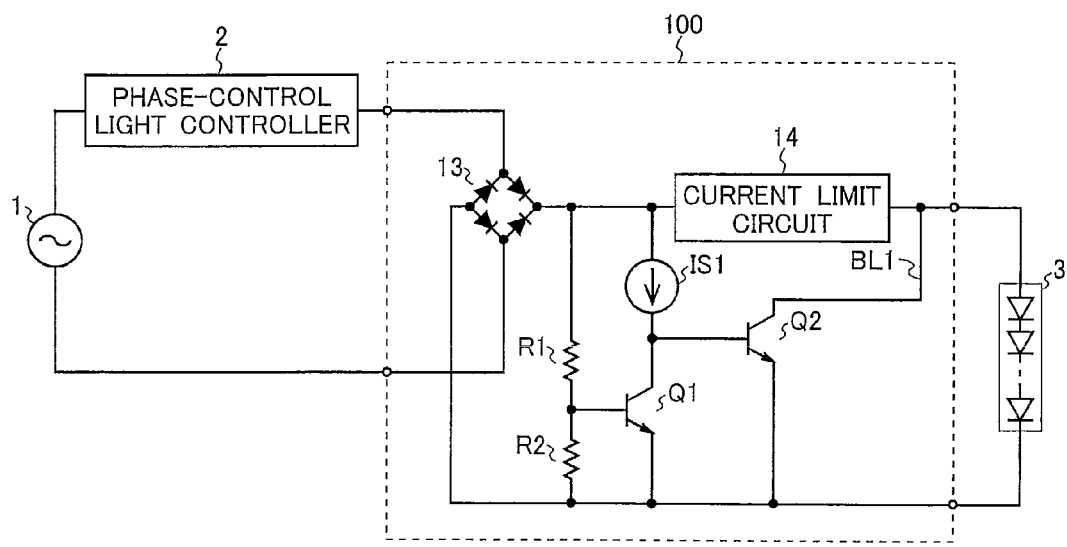
FIG. 22 is a diagram showing another specific example of the LED lighting system shown in FIG. 19.

Next, another specific example of the LED lighting system shown in FIG. 19 is shown in FIG. 22. In FIG. 22, the voltage detection circuit 15 is composed of division resistors R1 and R2, and the controller 12 is composed of a first transistor Q1 of which the base is connected to the output of the voltage detection circuit composed of the division resistors R1 and R2, and a constant-current source IS1 connected to the collector of the transistor Q1. Here, the active device 11 is a second transistor Q2.

While the midpoint voltage of the division resistors R1 and R2 is lower than the base-emitter voltage of the transistor Q1, the transistor Q1 remains off; thus, the current from the constant-current source IS1 is supplied to the base of the transistor Q2, and the transistor Q2 turns on. As a result, no leak current passes through the LED module 3, and thus the LED module 3 does not light. By contrast, while the midpoint voltage of the division resistors R1 and R2 is equal to or higher than the base-emitter voltage of the transistor Q1, the transistor Q1 remains on; thus, the current from the constant-current source IS1 is not supplied to the base of the transistor Q2, and the transistor Q2 turns off. As a result, no current passes through the bypass line BL1.

By varying the resistance ratio of the division resistors R1 and R2, it is possible to vary the timing with which the transistor Q2 is turned on and off. Moreover, by setting the constant current value of the constant-current source IS1 and the h parameter $h_{FE}$ of the transistor Q2 such that the collector-emitter voltage of the transistor is sufficiently low, it is possible to prevent a rising voltage delay in the triac (unillustrated in FIG. 22) in the phase-control light controller 2.

Figure 23:
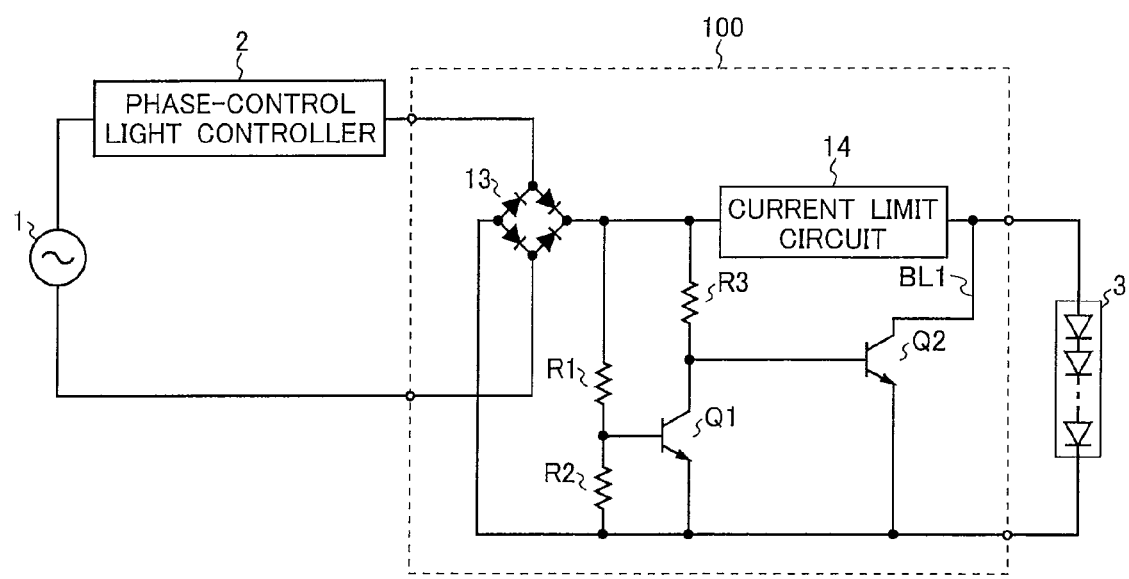
FIG. 23 is a diagram showing a configuration obtained by replacing the constant-current source in the LED lighting system shown in FIG. 22 with a resistor.

The constant-current source IS1 in the configuration shown in FIG. 22 may be replaced with a resistor R3 as in the configuration shown in FIG. 23. As compared with the configuration shown in FIG. 22, the configuration shown in FIG. 23 helps simplify, and reduce the cost of, the controller.

Figure 24A:
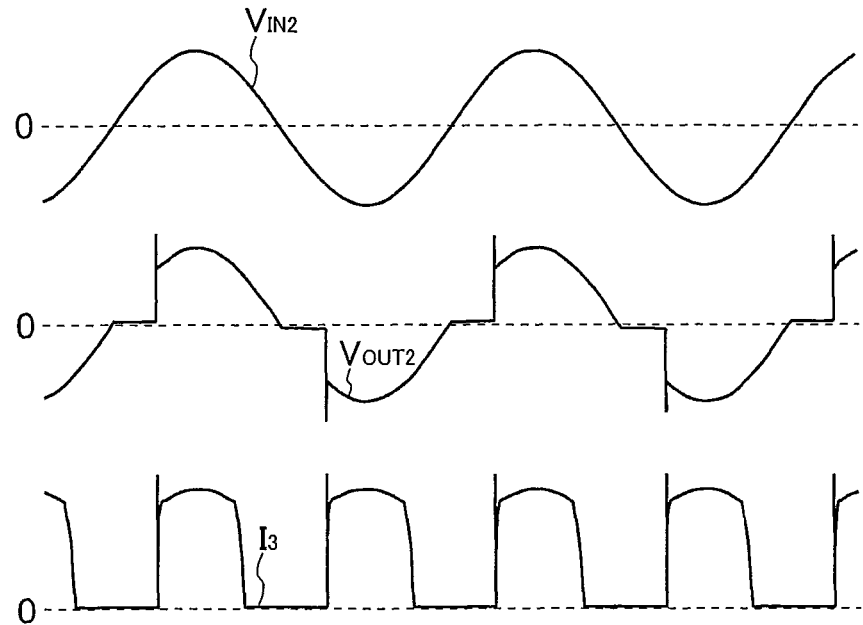
FIG. 24A is a diagram showing an example of operating waveforms in the specific examples shown in FIGS. 20 to 23.
Figure 24B:
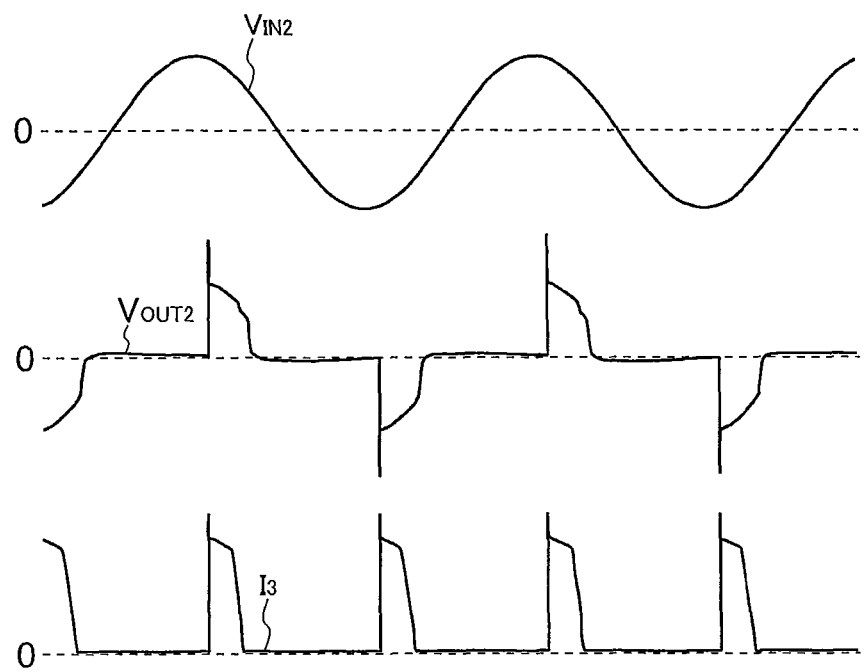
FIG. 24B is a diagram showing an example of operating waveforms in the specific examples shown in FIGS. 20 to 23.
Figure 24C:
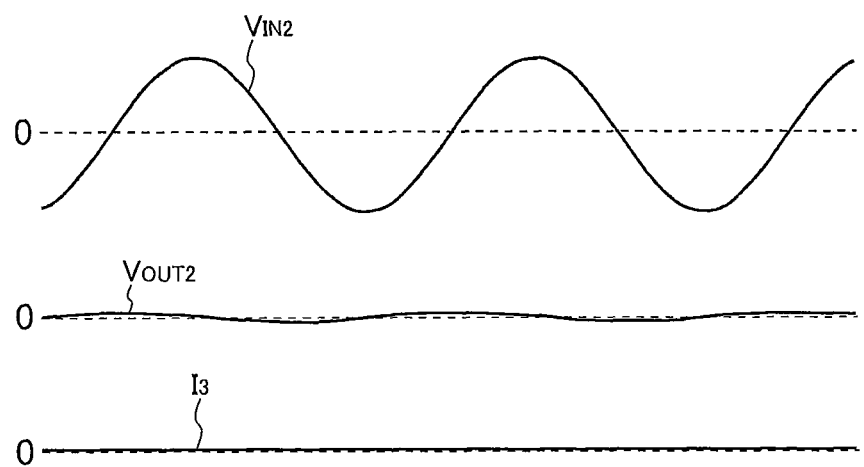
FIG. 24C is a diagram showing an example of operating waveforms in the specific examples shown in FIGS. 20 to 23.

Examples of the operating waveforms in the specific examples shown in FIGS. 20 to 23 are shown in FIGS. 24A to 24C. In FIGS. 24A to 24C, $V_{IN2}$ indicates the waveform of the input voltage to the phase-control light controller 2, $V_{OUT2}$ indicates the waveform of the output voltage of the phase-control light controller 2, and $I_3$ indicates the waveform of the current passing through the LED module 3. FIG. 24A shows the waveforms when the light is controlled to be 100% (no delay in phase), FIG. 24B shows the waveforms when the light is controlled to be medium (a medium delay in phase), and FIG. 24C shows the waveforms when the light is controlled to be 0% (the maximum delay in phase), that is, when the light is off.

As will be clear from FIGS. 24A to 24C, when the LED module 3 is driven with the AC power source 1, the phase-control light controller 2, and the LED drive circuit 100 connected in series, the lighting of the LED module 3 can be controlled from 100% to 0%. In addition, the current $I_3$ passing through the LED module 3 does not contain an unnecessary current.

Figure 25:
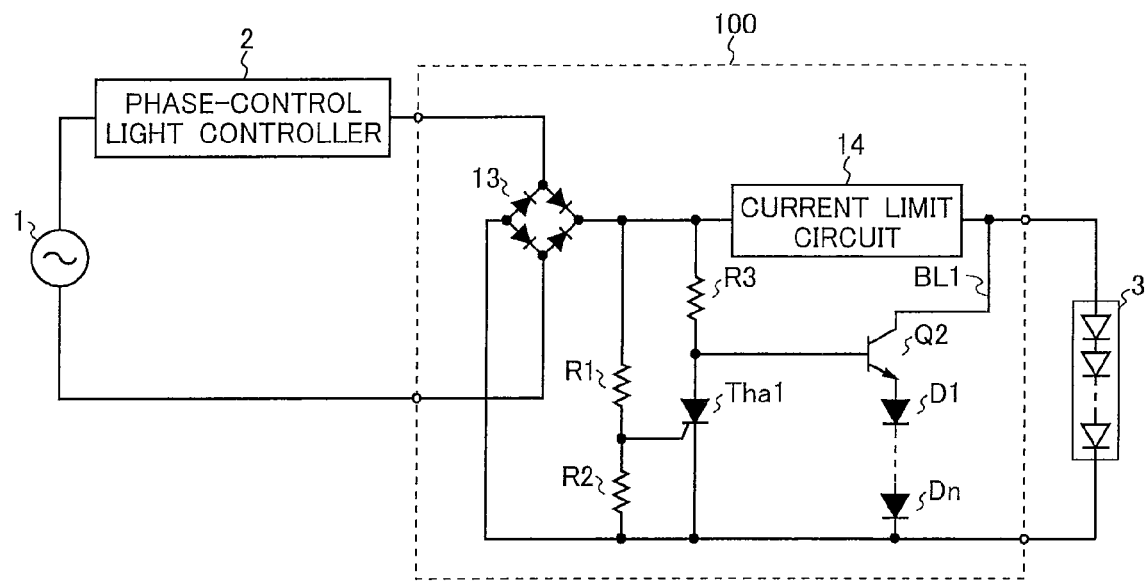
FIG. 25 is a diagram showing yet another specific example of the LED lighting system shown in FIG. 19.

Next, another specific example of the LED lighting system shown in FIG. 19 is shown in FIG. 25. In FIG. 25, the voltage detection circuit 15 is composed of division resistors R1 and R2, and the controller 12 is composed of a thyristor Tha1 of which the gate is connected to the output of the voltage detection circuit composed of the division resistors R1 and R2, and a resistor R3 connected to the anode of the thyristor Tha1. Here, the active device 11 is a transistor Q2. In addition, a plurality of diodes D1 to Dn connected to the emitter of the transistor Q2 are provided in the bypass line BL1.

While the midpoint voltage of the division resistors R1 and R2 is lower than the gate voltage of the thyristor Tha1, the thyristor Tha1 remains off; thus, the current from the resistor R3 as a current source is supplied to the base of the transistor Q2, and the transistor Q2 turns on. As a result, no leak current passes through the LED module 3, and thus the LED module 3 does not light. By contrast, while the midpoint voltage of the division resistors R1 and R2 is equal to or higher than the gate voltage of the thyristor Tha1, the thyristor Tha1 remains on; thus, the current from the resistor R3 as a current source is not supplied to the base of the transistor Q2, and the transistor Q2 turns off. As a result, no current passes through the bypass line BL1.

In the configuration shown in FIG. 25, the thyristor Tha1 is used in place of the transistor Q1 in FIG. 22 or 23. The use of the thyristor Tha1 here helps further reduce power loss and improve power efficiency. Specifically, the output voltage (collector-emitter voltage) of the transistor Q2 which appears when the AC voltage outputted from the AC power source 1 is in the middle of falling from its peak voltage of 141 V to 0 V is suppressed by the holding current function of the thyristor Tha1. Like the transistor Q1, the thyristor Tha1 goes into the on state on receiving the trigger voltage; for the period of half the cycle of the AC voltage outputted from the AC power source 1, however, even when the trigger voltage interrupts, the thyristor Tha1 keeps the on-state current passing; consequently, the base-emitter voltage of the transistor Q2 remains at low level, and thus the transistor Q2 can remain in the off state.

The plurality of diodes D1 to Dn connected to the emitter of the transistor Q2 are one example of a means of making the emitter potential of the transistor Q2 higher than the on voltage (typically about 1.4 V) of the thyristor Tha1 in order to control the transistor Q2 by turning on and off the thyristor Tha1. Any other method may be used to make the emitter potential of the transistor Q2 higher.

Figure 26:
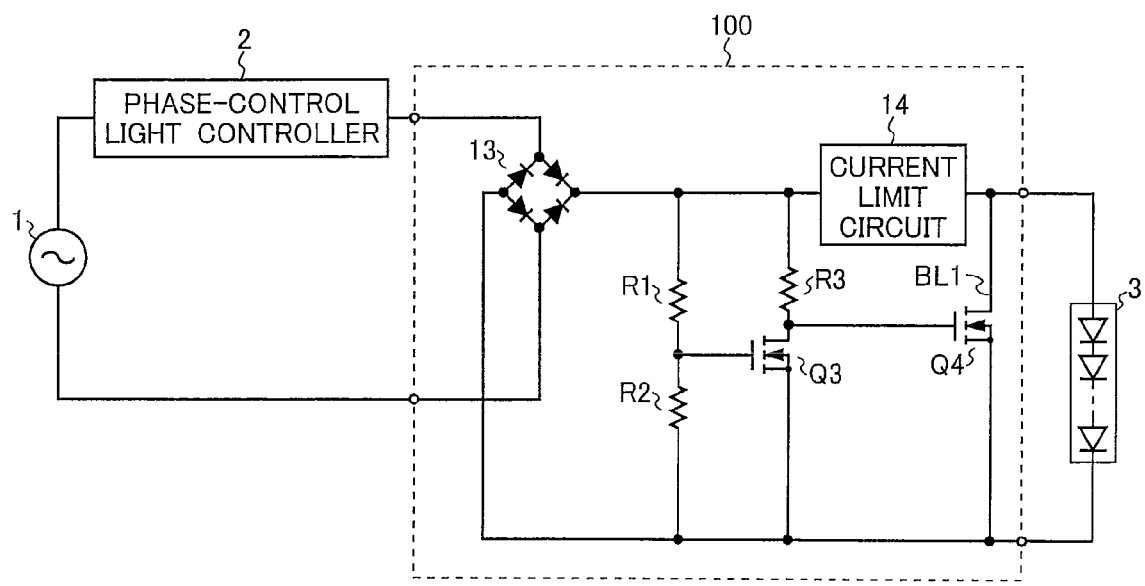
FIG. 26 is a diagram showing a specific example in which MOS transistors are used in the LED lighting system shown in FIG. 19.

Next, a specific example in which MOS transistors are used in the LED lighting system shown in FIG. 19 is shown in FIG. 26. In the configuration shown in FIG. 26, as compared with the configuration shown in FIG. 23, the first transistor Q1 is replaced with a first N-channel MOS transistor Q3 and the second transistor Q2 is replaced with a second N-channel MOS transistor Q4, the resulting configuration achieving a similar function to the configuration shown in FIG. 23.

Example 2 of Unnecessary Lighting Prevention Circuit

Figure 27:
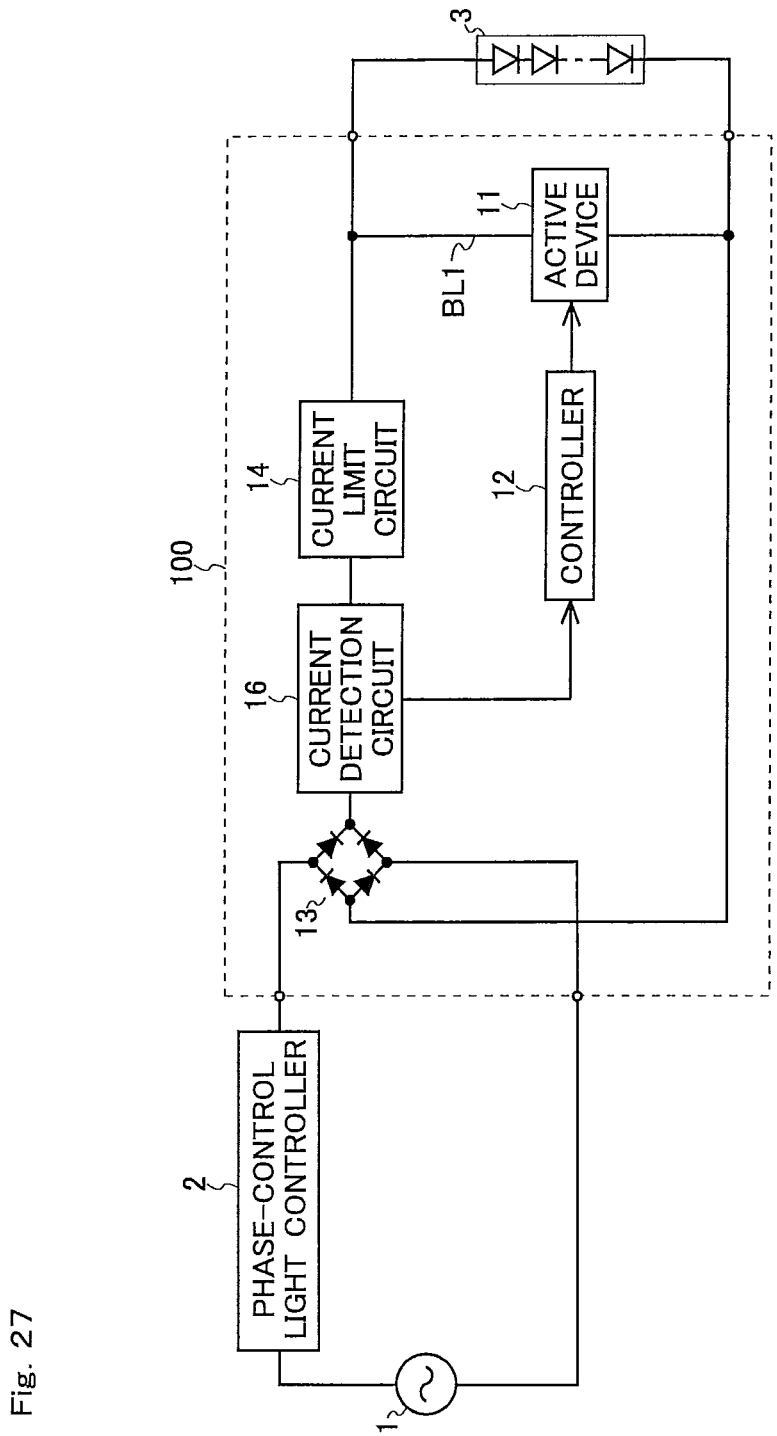
FIG. 27 is a diagram showing the configuration of an LED lighting system provided with an unnecessary lighting prevention circuit of Example 2.

Example 2 of the unnecessary lighting prevention circuit 10 is shown in FIG. 27. Removing the diode bridge 13 and the current limit circuit 14 from the LED drive circuit 100 leaves what corresponds to Example 2 of the unnecessary lighting prevention circuit 10.

Figure 28:
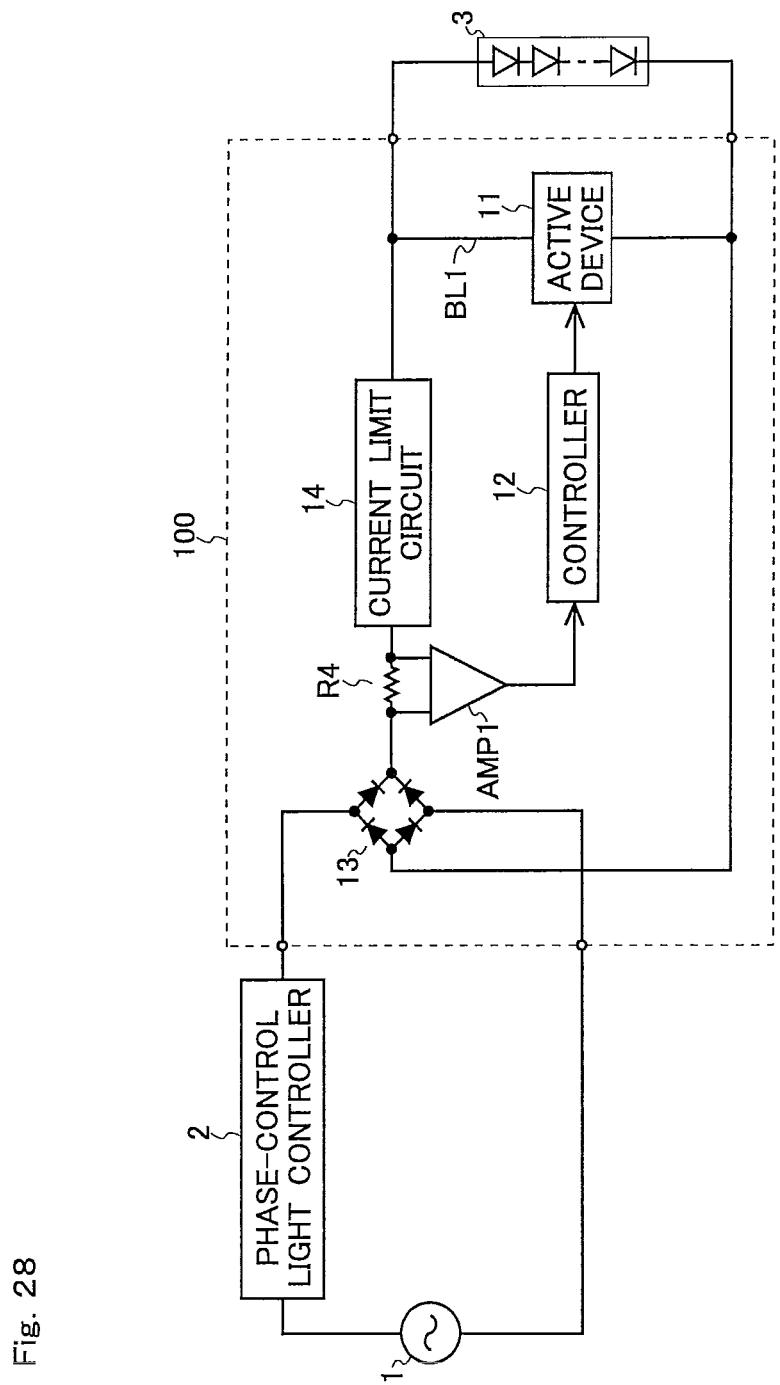
FIG. 28 is a diagram showing a specific example of the LED lighting system shown in FIG. 27.

In the LED lighting system shown in FIG. 27, the LED drive circuit 100 is provided with a diode bridge 13 which rectifies the input voltage to the LED drive circuit 100, a current limit circuit 14 which limits the current passing through the LED module 3, and a current detection circuit 16 which monitors the output current of the diode bridge 13. The voltage outputted from the AC power source 1 and then phase-controlled by the phase-control light controller 2 is full-wave-rectified by the diode bridge 13, and is then applied via the current limit circuit 14 to the LED module 3. According to the result of the monitoring by the current detection circuit 16, the controller 12 turns on and off the active device 11. One example of the current detection circuit 16 is one composed of, as shown in FIG. 28, a current detection resistor R4 and an error amplifier AMP1 which detects the voltage across the current detection resistor R4. As specific examples of the active device 11, the controller 12, and the current limit circuit 14 in Example 2 shown in FIG. 27, it is possible to apply specific examples of the active device 11, the controller 12, and the current limit circuit 14 in Example 1 described previously.

Example 3 of Unnecessary Lighting Prevention Circuit

In the Example 3 of the unnecessary lighting prevention circuit 10, as compared with Example 1 of the unnecessary lighting prevention circuit 10, the voltage detection circuit 15 is replaced with an external signal input terminal, and according to an external signal fed in via the external signal input terminal, the controller 12 turns on and off the active device 11. The external signal is generated by a pulse generator, such as a control circuit incorporated in a simple microcomputer or a phase-control light controller, and is supplied to the external signal input terminal. With this configuration, it is possible to easily add extra functions, such as a shut-down function for turning the LEDs off in an abnormal condition, a timer-activated lighting function, etc.

Modified Examples Etc.

The input voltage to LED drive circuits according to the invention is not limited to a commercial 100 V source voltage as used within Japan. By appropriately setting the circuit constants in LED drive circuits according to the invention, it is possible to use a commercial source voltage overseas, or a stepped-down AC voltage, as the input voltage to LED drive circuits according to the invention.

LED drive circuits according to the invention may be additionally provided with a protection device such as a current fuse. This helps realize safer LED drive circuits.

In the above-described configurations of LED drive circuits according to the invention, the bypass line of the bypass circuit is provided on the output side of the diode bridge provided in the stage preceding the current limit circuit. Instead, the bypass line of the bypass circuit may be provided on the input side of the diode bridge provided in the stage preceding the current limit circuit, or may be provided in a stage succeeding the current limit circuit. In a case where the bypass line of the bypass circuit is provided in a stage succeeding the current limit circuit, however, settings need to be made such that the current value of the current passing through the bypass circuit is lower than the current limit value of the current limit circuit.

In the LED drive circuits described above, the current limit circuit 5 is connected on the anode side of the LED module 3. Instead, with the circuit constants set appropriately, the current limit circuit 5 may be connected on the cathode side of the LED module 3 without any problem.

Figure 29:
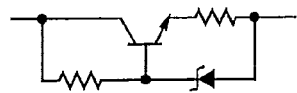
FIG. 29 is a diagram showing an example of the configuration of a current limit circuit.

The current limit circuit 5 is a circuit for preventing a current higher than the rated current from passing through the LED module 3. The limiting of the current may be achieved by use of a passive device such as a resistor alone, or by use of a combination of a resistor with an active device such as a transistor (for example, the configuration shown in FIG. 29).

In a case where the current passed through the LED module 3 has a sufficient margin from the rated current of the LEDs, the current limit circuit 5 may be omitted without any effect on the light control operation etc.

The phase-control light controller used with LED drive circuits according to the invention is not limited to the configuration of the phase-control light controller 2 (see FIG. 1).

The voltage inputted to LED drive circuits according to the invention is not limited to a voltage based on an AC voltage with a sinusoidal waveform; it may be any other kind of alternating-current voltage.

LED drive circuits according to the invention may be provided with a timer so that the current extraction start timing and the current extraction duration are adjusted by the timer on a software basis.

The LED drive circuits described above are all provided with a diode bridge. In LED drive circuits according to the invention, however, a diode bridge is not an essential component. In a configuration without a diode bridge, for example, two LED modules are arranged with their forward direction pointing in opposite directions, and for each LED module, there are provided a current limit circuit, a timing adjustment circuit, and a bypass circuit. This configuration has, among others, the following advantages: it does not require a diode bridge; as a result, it offers slightly higher power efficiency; and it prolongs the lifetime of LEDs (alleviates the lowering of their luminance) because the duty ratio of the LED drive current is half that by the method that involves full-wave rectification before driving. On the other hand, the same configuration has the disadvantage of increased cost due to twice the number of LEDs.

LED Lamps According to the Invention

Figure 30:
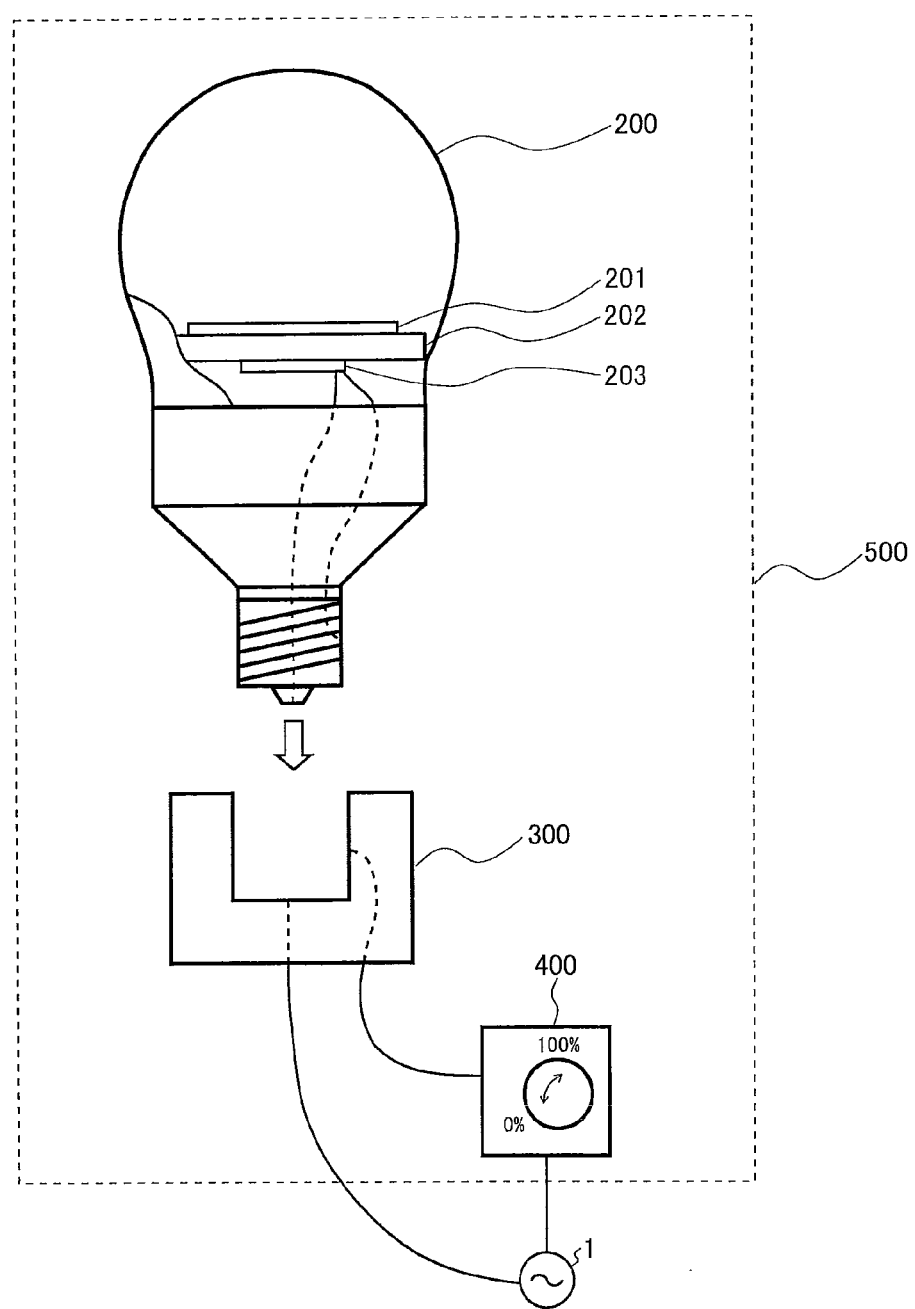
FIG. 30 is a diagram showing an example of an outline of the structure of an LED lamp according to the invention.

Lastly, an outline of the structure of an LED lamp according to the invention will be described. An example of an outline of the structure of an LED lamp according to the invention is shown in FIG. 30. FIG. 30 is a partly-cutout diagram showing a bulb-form LED lamp 200 according to the invention. The bulb-form LED lamp 200 according to the invention is provided with, housed inside it, a chassis or substrate 202, an LED module 201 comprising one or more LEDs and arranged on the front face (the face on the head side of the lamp-like shape) of the chassis or substrate 202, and a circuit 203 arranged on the back face (the side on the base side of the lamp-like shape). Used as the circuit 203 is, for example, one of the above-described LED drive circuits according to the invention. Needless to say, the circuit 203 is not limited to the above-described LED drive circuits according to the invention; it may be any circuit that is provided with a function of reducing the flickering and blinking of LEDs that may occur when used with a phase-control light controller.

An LED lamp holder 300 to which the bulb-form LED lamp 200 according to the invention is fitted by screw engagement and a light control unit 400 including a phase-control light controller are connected in series with the AC power source 1. The bulb-form LED lamp 200 according to the invention and the LED lamp holder 300 constitute an LED lighting appliance (such as a ceiling light, a pendant light, a kitchen light, a downlight, a stand light, a spotlight, a footlight, etc.). The bulb-form LED lamp 200 according to the invention, the LED lamp holder 300, and the light control unit 400 constitute an LED lighting system 500 according to the invention. The LED lamp holder 300 is arranged, for example, on a ceiling surface indoors, and the light control unit 400 is arranged, for example, on a wall surface indoors.

Since the bulb-form LED lamp 200 according to the invention is removably fitted to the LED lamp holder 300, for example, in existing lighting appliances and lighting systems conventionally employing lamps such as incandescent lamps and fluorescent lamps, simply by replacing the lamps such as incandescent lamps and fluorescent lamps with the bulb-form LED lamp 200 according to the invention, it is possible to prevent LEDs from being lit by an unnecessary current.

In FIG. 30, the exterior appearance of the light control unit 400 as it is when the light control unit 400 is the phase-control light controller 2 in FIG. 1 is illustrated. The intensity of lighting can be varied by means of a variable resistor provided with a knob.

The above description deals with an example in which the light control unit 400 is one comprising a knobbed variable resistor directly operated by a human. Instead, it may be one remote-controlled by a human by use of a wireless signal as transmitted from a remote control unit. Specifically, to achieve remote control, on the receiving side, the light control unit is provided with a wireless signal receiver and, on the transmitting side, a transmitter (for example, a remote control transmitter, a portable terminal, etc.) is provided with a wireless signal transmitter which transmits a light manipulation signal (for example, a light control signal, a light on/off signal, etc.) to the wireless signal receiver.

Figure 31:
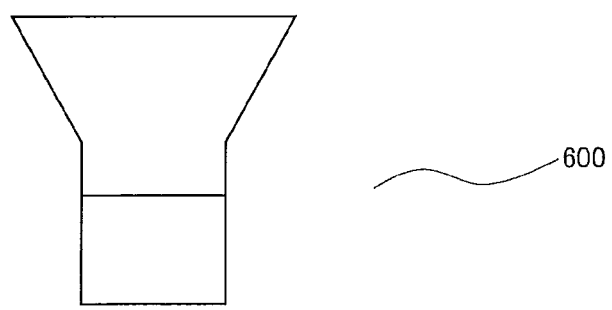
FIG. 31 is a diagram showing examples of an outline of the structure of other LED lamps according to the invention.
Figure 31:
Figure 31:
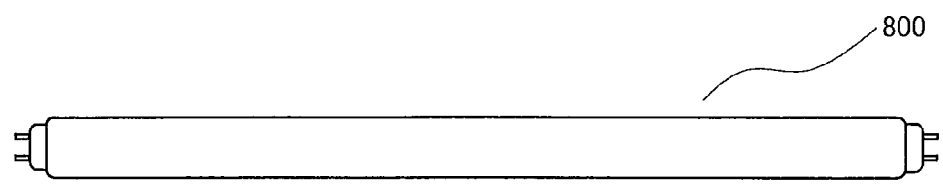

LED lamps according to the invention are not limited to bulb-form ones, but may instead be, for example, lamp-form LED lamps 600, ring-shaped LED lamps 700, or straight-tube LED lamps 800 as shown in FIG. 31. With any shape, LED lamps according to the invention incorporate an LED and a circuit provided with a function of reducing the flickering and blinking of an LED that may occur when used with a phase-control light controller. Preferably, they also incorporate a circuit (an unnecessary lighting prevention circuit) provided with a function of preventing the LED from being lit by an unnecessary current. Preferably, they further incorporate a circuit provided even with a power loss reducing function of reducing the power loss by the unnecessary lighting prevention circuit.

What is claimed is:

1. An LED drive circuit receiving an alternating-current voltage and driving an LED, comprising:
   a current extractor extracting a current from a current supply line through which an LED drive current is supplied to the LED; and
   a timing adjuster adjusting a current extraction start timing and a current extraction duration in the current extractor without detecting the LED drive current.

2. The LED drive circuit according to claim 1,
   wherein the timing adjuster comprises a voltage detection circuit monitoring an input voltage to the LED drive circuit or a voltage obtained by rectifying the input voltage, and current extraction in the current extractor is controlled according to a result of monitoring by the voltage detection circuit.

3. The LED drive circuit according to claim 2,
   wherein the timing adjuster comprises a comparator comparing the result of monitoring by the voltage detection circuit with a set voltage, and the current extraction in the current extractor is controlled according to a result of comparison by the comparator.

4. The LED drive circuit according to claim 3,
   wherein the comparator has hysteresis.

5. The LED drive circuit according to claim 3, wherein
the timing adjuster comprises a first transistor of which a base is connected to an output of the voltage detection circuit,
the current extractor comprises a second transistor of which a base is connected to a collector of the first transistor, and
the timing adjuster further comprises a capacitor connected between the bases of the first and second transistors.

6. The LED drive circuit according to claim 1,
wherein the timing adjuster comprises a voltage variation detection circuit detecting a variation in an input voltage to the LED drive circuit or a voltage obtained by rectifying the input voltage, and current extraction in the current extractor is controlled according to a result of monitoring by the voltage variation detection circuit.

7. The LED drive circuit according to claim 6, wherein
the timing adjuster comprises a resistor, a capacitor, and a first transistor of which a base is connected to a node between the resistor and the capacitor, and
the current extractor comprises a second transistor of which a base is connected to a collector of the first transistor.

8. The LED drive circuit according to claim 6, wherein
the timing adjuster comprises a serial circuit having a capacitor and a resistor connected in series in this order from a high-potential side to a low-potential side, and
the current extractor comprises a transistor of which a base is connected to a node between the capacitor and the resistor.

9. The LED drive circuit according to claim 6, further comprising:
an unnecessary lighting preventer preventing the LED from being lit by an unnecessary current.

10. The LED drive circuit according to claim 5, wherein
the current extractor comprises a constant-current source connected to an emitter of the second transistor provided in the current extractor, and
the second transistor provided in the current extractor is driven on a constant-current basis.

11. The LED drive circuit according to claim 7, wherein
the current extractor comprises a constant-current source connected to an emitter of the second transistor provided in the current extractor, and
the second transistor provided in the current extractor is driven on a constant-current basis.

12. The LED drive circuit according to claim 8, wherein
the current extractor comprises a constant-current source connected to an emitter of the transistor provided in the current extractor, and
the transistor provided in the current extractor is driven on a constant-current basis.

13. An LED lamp comprising:
an LED drive circuit; and
an LED connected to an output side of the LED drive circuit,
wherein the LED drive circuit receives an alternating-current voltage and drives the LED, the LED drive circuit comprising:
a current extractor extracting a current from a current supply line through which an LED drive current is supplied to the LED; and
a timing adjuster adjusting a current extraction start timing and a current extraction duration in the current extractor without detecting the LED drive current.

14. An LED lighting appliance comprising:
an LED lamp,
wherein the LED lamp comprises:
an LED drive circuit; and
an LED connected to an output side of the LED drive circuit, and
wherein the LED drive circuit receives an alternating-current voltage and drives the LED, the LED drive circuit comprising:
a current extractor extracting a current from a current supply line through which an LED drive current is supplied to the LED; and
a timing adjuster adjusting a current extraction start timing and a current extraction duration in the current extractor without detecting the LED drive current.

15. An LED lighting system comprising:
an LED lamp or an LED lighting appliance comprising an LED lamp; and
a light control unit connected to an input side of the LED lamp or the LED lighting appliance,
wherein the LED lamp comprises:
an LED drive circuit; and
an LED connected to an output side of the LED drive circuit,
wherein the LED drive circuit receives an alternating-current voltage and drives the LED, the LED drive circuit comprising:
a current extractor extracting a current from a current supply line through which an LED drive current is supplied to the LED; and
a timing adjuster adjusting a current extraction start timing and a current extraction duration in the current extractor without detecting the LED drive current, and
wherein the light control unit comprises a phase-control light controller.

* * * * *